US008666812B1

(12) United States Patent
Gandhi

(10) Patent No.: US 8,666,812 B1
(45) Date of Patent: Mar. 4, 2014

(54) DISTRIBUTING CONTENT BASED ON TRANSACTION INFORMATION

(75) Inventor: Kawaljit Gandhi, San Francisco, CA (US)

(73) Assignee: Google Inc., Mountain View, CA (US)

( * ) Notice: Subject to any disclaimer, the term of this patent is extended or adjusted under 35 U.S.C. 154(b) by 552 days.

(21) Appl. No.: 12/834,501

(22) Filed: Jul. 12, 2010

Related U.S. Application Data

(63) Continuation-in-part of application No. 12/615,324, filed on Nov. 10, 2009.

(51) Int. Cl.
*G06Q 30/00* (2012.01)

(52) U.S. Cl.
USPC .................................................. 705/14.52

(58) Field of Classification Search
USPC ............. 705/14.52, 14.49; 709/203, 206, 207
See application file for complete search history.

(56) References Cited

U.S. PATENT DOCUMENTS

| | | | |
|---|---|---|---|
| 6,736,322 B2 * | 5/2004 | Gobburu et al. ......... 235/462.46 |
| 7,106,471 B2 | 9/2006 | Ohwa | |
| 7,203,684 B2 | 4/2007 | Carobus et al. | |
| 7,788,129 B2 * | 8/2010 | Antonucci et al. ........... 705/14.3 |
| 8,051,112 B2 | 11/2011 | Evanitsky | |
| 8,095,597 B2 * | 1/2012 | Rawat et al. .................. 709/206 |
| 8,195,133 B2 | 6/2012 | Ramer et al. | |
| 2002/0174185 A1 * | 11/2002 | Rawat et al. .................. 709/206 |
| 2003/0229537 A1 * | 12/2003 | Dunning et al. ................ 705/10 |
| 2004/0225563 A1 * | 11/2004 | Lawe .............................. 705/14 |
| 2005/0144069 A1 | 6/2005 | Wiseman et al. | |
| 2005/0165817 A1 * | 7/2005 | O'Conor ....................... 707/101 |
| 2005/0222906 A1 * | 10/2005 | Chen ............................... 705/14 |
| 2008/0091535 A1 * | 4/2008 | Heiser et al. .................... 705/14 |
| 2008/0177600 A1 * | 7/2008 | McCarthy et al. ................ 705/7 |
| 2008/0243864 A1 * | 10/2008 | McGauley et al. ............. 707/10 |
| 2008/0313066 A1 | 12/2008 | Sholtis et al. | |
| 2009/0125444 A1 * | 5/2009 | Cochran et al. ................ 705/50 |
| 2009/0132395 A1 * | 5/2009 | Lam et al. ....................... 705/30 |

(Continued)

FOREIGN PATENT DOCUMENTS

| | | |
|---|---|---|
| KR | 10-2009-0033989 A | 4/2009 |
| KR | 10-2009-0114881 A | 11/2009 |

OTHER PUBLICATIONS

Author: Lee, C.K., Title: International Search Report and Written Opinion for International Patent Application No. PCT/US2011/043620, pp. 1-11, Date: Jan. 2, 2012.

(Continued)

*Primary Examiner* — John G Weiss
*Assistant Examiner* — Adam Chornesky
(74) *Attorney, Agent, or Firm* — Johnson, Marcou & Isaacs, LLC

(57) ABSTRACT

Content providers can target individuals for receipt of selected content based, at least in part, on profiles associated with users. The associations between the users and the profiles are determined based on analysis of receipts for transactions completed by the users. These receipts contain information that is indicative of the individuals' spending habits. Electronic correspondence associated with the users is scanned to identify the receipts and information is extracted from the receipts for use in the analysis. The individuals can opt-in to receive content targeted to the profiles associated with their accounts without allowing the content providers to have direct access to their receipts or their identity. The individuals can also opt-out if they no longer want to receive targeted content.

40 Claims, 11 Drawing Sheets

(56) References Cited

U.S. PATENT DOCUMENTS

| | | |
|---|---|---|
| 2009/0198556 A1* | 8/2009 | Selinger et al. ................. 705/10 |
| 2009/0228340 A1* | 9/2009 | Bohannon ....................... 705/10 |
| 2009/0248523 A1* | 10/2009 | Hueter et al. ................... 705/14 |
| 2009/0281923 A1* | 11/2009 | Selinger et al. ................. 705/27 |
| 2010/0005156 A1 | 1/2010 | Wesby |
| 2010/0100435 A1* | 4/2010 | Matz et al. ................. 705/14.45 |
| 2010/0106598 A1* | 4/2010 | Grimes ...................... 705/14.53 |
| 2010/0138289 A1* | 6/2010 | Ferro et al. ................. 705/14.27 |
| 2010/0185513 A1* | 7/2010 | Anderson et al. .......... 705/14.49 |
| 2010/0306080 A1 | 12/2010 | Trandal et al. |
| 2011/0040801 A1* | 2/2011 | Macaleer et al. ............. 707/803 |
| 2011/0166934 A1 | 7/2011 | Comay et al. |
| 2011/0185015 A1* | 7/2011 | Stolper ........................ 709/203 |
| 2011/0208588 A1 | 8/2011 | Joa et al. |
| 2011/0258049 A1 | 10/2011 | Ramer et al. |
| 2012/0072280 A1 | 3/2012 | Lin |
| 2012/0215640 A1 | 8/2012 | Ramer et al. |

OTHER PUBLICATIONS

Author: Lindner, N., Title: International Preliminary Report on Patentability for International Patent Application No. PCT/US2011/0043620, pp. 1-8, Date: Jan. 15, 2013.

Author: Chornesky, A., Title: Office Action issued in copending U.S. Appl. No. 13/025,837, filed Feb. 11, 2011, pp. 1-26, Date: Apr. 25, 2013.

Author: Larn, B., Title: Australian Exam Report issued in related Australian Application No. 2011279407, pp. 1-4, Date: Apr. 30, 2013.

Author: Chornesky, A., Title: Office Action issued in copending U.S. Appl. No. 13/025,837, filed Feb. 11, 2011, pp. 1-24, Date: Nov. 14, 2013.

* cited by examiner

FIG. 7A

| Description | | | Date | Date | Num | Amount | Ads |
|---|---|---|---|---|---|---|---|
| 115a | 115b | 115c | 700 | 703 | | | |
| PMT FROM BILL/PAYER SERVICE - RVICE Purchases and Adjustments | -- | -- | 07/08/2009 | 07/08/2009 | 2126 | -$1,313.00 | Coffee — Huge Selection of Coffee & Coffee Products. Free Shipping & No Tax. www.WholeLatteLove.com California (117a) |
| THE US GRANT A LUXURY - SAN DIEGO CA 153835 | -- | -- | 06/24/2009 | 06/23/2009 | 8309 | $541.35 | |
| ARRIVAL DATE 6/23/09 | | | | | | | |
| LIL PIGGY'S - CORONADO CA | -- | -- | 06/29/2009 | 06/26/2009 | 0485 | $9.78 | |
| SD ZOO - ADMISSIONS - SAN DIEGO CA | -- | -- | 06/29/2009 | 06/26/2009 | 0547 | $70.00 | |
| SS ZOO - TREEHOUSE/FS - SAN DIEGO CA | -- | -- | 06/29/2009 | 06/26/2009 | 0437 | $13.34 | |
| TRATTORIA LA STRADA - SAN DIEGO CA | -- | -- | 06/29/2009 | 06/26/2009 | 0734 | $24.00 | JetBlue from San Jose — Award-winning service. TV at every seat, lots of legroom & more. jetblue.com/san_jose |
| SD ZOO ELPODY FS1118 - 6192311515 CA | -- | -- | 06/29/2009 | 06/26/2009 | 1551 | $8.69 | |
| G-STAR RAW - SAN DIEGO CA | -- | -- | 06/29/2009 | 06/27/2009 | 0249 | $117.45 | |
| T.G.I. FRIDAY'S GASLAM - SAN DIEGO CA | -- | -- | 06/29/2009 | 06/27/2009 | 0702 | $15.00 | |
| STARBUCKS USA 00053165 - SAN DIEGO CA | -- | -- | 06/29/2009 | 06/27/2009 | 0840 | $4.90 | |
| TRADER JOE'S # 019 - SAN FRANCISC CA | -- | -- | 06/29/2009 | 06/28/2009 | 9004 | $47.38 | Shop Raley's Online — Save time & grocery shop online. Buy only what you need! www.Raleys.com San Francisco-Oakland-San Jose, CA |
| TRADER JOE'S # 019 - SAN FRANCISC CA | -- | -- | 06/29/2009 | 06/28/2009 | 9491 | $4.35 | |
| HEAVENLY CUPCAKES - SAN DIEGO CA | -- | -- | 06/30/2009 | 06/27/2009 | 0574 | $5.00 | |
| SUSHI DELI #2 - SAN DIEGO CA | -- | -- | 07/01/2009 | 06/27/2009 | 2601 | $40.00 | |
| SAFEWAY STORE 00026062 - SAN FRANCISC CA 00918213683430 | -- | -- | 07/02/2009 | 06/30/2009 | 3560 | $10.16 | |
| CHINATOWN KITE SHOP - SAN FRANCISC CA | -- | -- | 07/02/2009 | 06/30/2009 | 1069 | $164.19 | |
| SAFEWAY STORE 00026062 - SAN FRANCISC CA 08918405630279 | -- | -- | 07/04/2009 | 07/02/2009 | 2121 | $13.43 | Sushi Bistro on 24th St — Sushi Masters 2005 SR Award Winner! Taste The New Style of Sushi Rolls www.sushibistro.com San Francisco-Oakland-San Jose, CA (117b, 117c) |
| TARGET 00014076 - DALY CITY CA | -- | -- | 07/06/2009 | 07/03/2009 | 5256 | $4.35 | |
| TARGET 00014076 - DALY CITY CA | -- | -- | 07/06/2009 | 07/03/2009 | 0618 | $45.14 | |
| YUZU - SAN FRANCISC CA | -- | -- | 07/06/2009 | 07/04/2009 | 0191 | $22.00 | |
| STARBUCKS USA 00102194 - SAN FRANCISC CA | -- | -- | 07/06/2009 | 07/04/2009 | 7741 | $1.50 | |
| SAFEWAY STORE 00017111 - SAN FRANCISC CA 16918566828486 | -- | -- | 07/06/2009 | 07/04/2009 | 1238 | $1.69 | |
| STARBUCKS USA 00102194 - SAN FRANCISC CA | -- | -- | 07/06/2009 | 07/04/2009 | 7808 | $2.55 | |
| SAFEWAY STORE 00017111 - SAN FRANCISC CA 16918581914872 | -- | -- | 07/06/2009 | 07/04/2009 | 1485 | $25.42 | |
| IN-N-OUT BURGER 000000 - SAN FRANCISC CA | -- | -- | 07/07/2009 | 07/05/2009 | 3317 | $3.77 | |
| IHOP #1762 - SAN FRANCISC CA | -- | -- | 07/07/2009 | 07/05/2009 | 1194 | $15.00 | |
| CROSSROADS CAFÉ - SAN FRANCISC CA | -- | -- | 07/07/2009 | 07/05/2009 | 6973 | $2.50 | |
| TRADER JOE'S # 019 - SAN FRANCISC CA | -- | -- | 07/07/2009 | 07/05/2009 | 3311 | $11.26 | |
| WORLD MKT 00000109 - SAN FRANCISC CA | -- | -- | 07/07/2009 | 07/05/2009 | 0926 | $4.99 | |
| STARBUCKS USA 00059451 - SAN FRANCISC CA | -- | -- | 07/07/2009 | 07/06/2009 | 1284 | $1.40 | |
| THE SLANTED DOOR - SAN FRANCISC CA | -- | -- | 07/08/2009 | 07/07/2009 | 4640 | $65.00 | |
| Z CIOCCOLATO - SAN FRANCISC CA | -- | -- | 07/08/2009 | 07/07/2009 | 0211 | $5.09 | |
| VIRGIN AMERIM445TB - BURLINGAME CA | -- | -- | 07/09/2009 | 07/07/2009 | 8998 | $684.20 | |
| MAIL/PHONE | | | | | | | |
| 07/13 SF O/JFK RND TRP JFK/SFOJFK/SFO FO 0083 | | | | | | | |
| LA MAR CEBICHERIA PERU - SAN FRANCISC CA | -- | -- | 07/10/2009 | 07/07/2009 | 9871 | $55.95 | |
| GOOGLEONSITESTORE - MOUNTAIN VIE CA S11186930001 | -- | -- | 07/10/2009 | 07/08/2009 | 9354 | $56.50 | |

701

710

| | | |
|---|---|---|
| 11/06/2008 | DISNEY-POPCORN WAGO ANAHEIM CA | $3.50 |
| 11/06/2008 | DISNEY-BLUE RIBBON ANAHEIM CA | $3.65 |
| 11/06/2008 | DISNEY-STORYTELLERS ANAHEIM CA | $4.19 |
| 11/06/2008 | DISNEY-GIBSON GIRL ANAHEIM CA | $5.92 |
| 11/06/2008 | DISNEY-CARNATION CA ANAHEIM CA | $10.76 |
| 11/05/2008 | ELECTRONIC PAYMENT-THANK YOU | -$250.00 |
| 11/05/2008 | TA # 160 BUTTONWILLQ03 BUTTONWILLOW CA | $2.56 |
| 11/05/2008 | TA # 160 BUTTONWILLQ03 BUTTONWILLOW CA | $4.70 |
| 11/05/2008 | TORTILLA JO'S 00260323 ANAHEIM CA | $6.73 |
| ☐ 11/05/2008 | COMPASS BOOKS&807001156 ANAHEIM CA | $4.04 |

Starbucks® Coffee
Starbucks.com - It's Not Just Coffee It's Starbucks Explore Our Coffees.
Extreme Value Coffee
CoffeeBeanDirect.com – Better beans in your cup. More money in your pocket.
Coffee Deals
www.Free-Coffee-Deals.com/Coffee – From Gevalia, Boca Coffee, Keurig Free Coffee Makers and More!

| | 115b | | |
|---|---|---|---|
| 11/05/2008 | | LA BREA BAKERY CAFÉ IN ANAHEIM CA | $15.00 |
| 11/05/2008 | | HOUTAN PETROLEUM INC MOUNTAIN VIEW CA ——— 115c | $26.41 |
| ☐ 10/28/2008 | | DISNEY-WDTC UNDISTR ANAHEIM CA | $1,301.08 |

Cheap Hotels at Priceline
www.priceline.com – Save up to 50% on hotels. No one deals like we do.
ORBITZ Hotels
www.ORBITZ.com/Hotels – Find Cheap Hotel Rates & Pay No ORBITZ Hotel Change or Cancel Fees.
Hotels
www.Expedia.com – Save up to 50% on Hotels at Expedia And now Earn ThankYou Points Too!

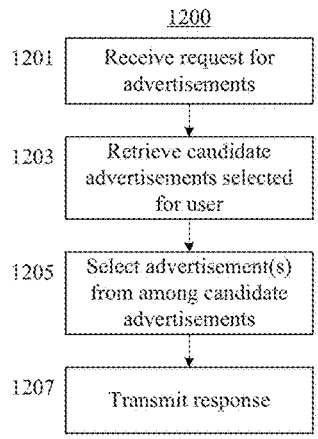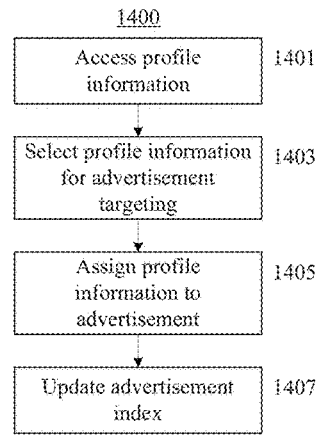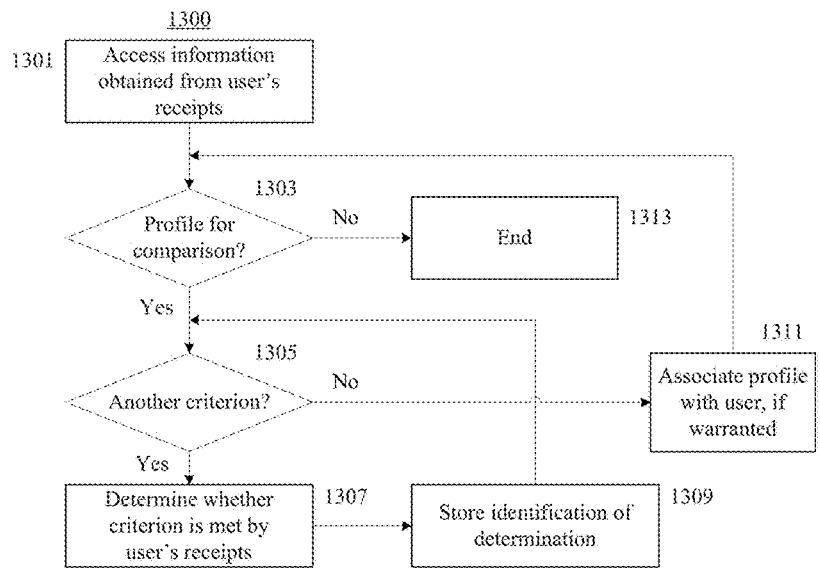

DISTRIBUTING CONTENT BASED ON TRANSACTION INFORMATION

CROSS REFERENCE TO RELATED APPLICATION

This non-provisional application is a continuation-in-part of U.S. patent application Ser. No. 12/615,324, entitled, "Distributing Content," filed Nov. 10, 2009, the entire contents of which are hereby fully incorporated herein by reference.

TECHNICAL FIELD

This disclosure relates generally to distributing content and more particularly to distributing content based on information obtained from receipts.

BACKGROUND

In many different environments, content providers want to distribute content to selected recipients. For example, advertisers want to distribute their advertisements to locations where the advertisements will be effective in communicating information to potential customers, and at times when the advertisements will lead to desired activity, such as a purchase of the advertiser's goods or services. In some instances, a content provider may rely on contextual information when making decisions regarding selections of individuals to receive content. For example, an advertiser may want to advertise goods and/or services relating to travel enthusiasts. In some instances, a content provider may rely on targeting information, such as demographic information of potential viewers, when selecting recipients to whom to distribute content. Additionally, content providers can rely on performance information regarding results achieved by previous selections of content recipients.

SUMMARY

Demographic information and/or historical performance information, among other types of information, can be replaced by or supplemented with information regarding purchases made by a potential recipient or viewer of content. For example, in the case of Internet advertising and distributing advertisements via electronic correspondence, an advertiser wants to distribute advertisements to consumers who have historically purchased goods and/or services that indicate that the consumers are more likely to purchase the advertiser's goods and/or services. In this context, consumption preferences that are indicated by prior purchase information are believed to be reliable predictors of future consumption preferences. Thus, profiles that include consumer purchase criteria are targetable objects for advertisers, or other content providers. Analysis of information obtained from a user's receipts for purchases or other types of transactions is used to determine whether the user should be associated with one or more of the profiles, such that when advertisements, promotional material, coupons, discounts, videos, training or technical materials, or other content is selected for display or transmission to the user, selection of the content is based, at least in part, on an association between one or more profiles and the user or an electronic mail ("e-mail") account of the user. The receipt information can be collected by identifying receipts in the user's e-mail messages and extracting information from the identified receipts. For example, many merchants provide electronic copies of receipts and/or order confirmations to users via e-mail. The selected content can be provided to the user by appending the content to an e-mail addressed to the user or by displaying the content in an Internet web browser window while the user is accessing their e-mail account.

In order to protect the privacy of the individual users, the profiles can be generic and include pre-determined membership criteria that determine whether a user or a user's e-mail account should be associated with the profile. Thus, unlike a profile which is generated specifically to target a specific user, membership in one or more of the profiles is not sufficient to identify a user. Nonetheless, the profile memberships associated with a user allow powerful targeting based on the information obtained from the user's receipts. Additionally, the associations between a user and the profiles can be represented using anonymous identifiers to prevent disclosure of a user's identity to any party, including advertisers or an advertisement server. Thus, all of the user's receipt and personal information is protected. Users may, in appropriate circumstances, be allowed to limit or otherwise affect the operation of the features disclosed in the specification. For example, users may be given an initial opportunity to opt-in or opt-out of the collection or use of certain data or the activation of certain features. In addition, users may be provided opportunities to change the manner in which the features are employed, including for situations in which users may have concerns regarding their privacy. Instructions may also be provided to users to notify them regarding policies about the use of information, including personally identifiable information, and manners in which they may affect such use of information. Thus, sensitive personal information can be used to benefit a user, if desired, through receipt of targeted advertisements or other information, without risking disclosure of personal information or the user's identity.

In one exemplary embodiment, a computer-implemented method for distributing content can include a processor evaluating an electronic message to determine whether the electronic message include a receipt for a purchase. In response to determination that the electronic message includes a receipt, a processor can extract information from the receipt. A processor can select content based at least in part upon the information extracted from the receipt. A processor can present the selected content.

In another exemplary embodiment, a computer-implemented method for distributing content can include accessing electronic receipts from an e-mail account. Transaction information associated with the receipts can be analyzed to determine whether the transaction information meets a membership criterion associated with a targeting profile of an advertisement system. The e-mail account can be automatically associated with the targeting profile based on a determination that the transaction information meets the criterion.

In yet another exemplary embodiment, a computer-implemented method can include a processor evaluating an electronic message associated with an e-mail account to determine whether the electronic message includes a receipt for a purchase. In response to a determination that the electronic message includes a receipt, information can be obtained from the receipt. The obtained information can be stored in a data store.

In yet another exemplary embodiment, a computer-implemented method for distributing content can include a processor searching an electronic device for information identifying at least one consumer product stored on the device. In response to finding information identifying at least one consumer product stored on the device, information regarding the at least one consumer product can be obtained. A processor can receive a request for content. A processor can select content for transmission in response to the request for content, the content being selected from available content based on the information regarding the at least one consumer product. The selected content can be transmitted in response to the request for content.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more compete understanding of the exemplary embodiments of the present invention and the advantages thereof, reference is now made to following description in conjunction with the accompanying drawings in which:

FIGS. 7A and 7B are illustrations of example output displays of the system of FIG. 1, in accordance with certain exemplary embodiments.

FIG. 12 is a diagram illustrating a process for selecting content for distribution, in accordance with certain exemplary embodiments.

FIG. 13 is a diagram illustrating a process for determining profile associations for a user based on information obtained from the user's receipts, in accordance with certain exemplary embodiments.

FIG. 14 is a diagram illustrating a process for targeting content based on profile information, in accordance with certain exemplary embodiments.

Figure 1:
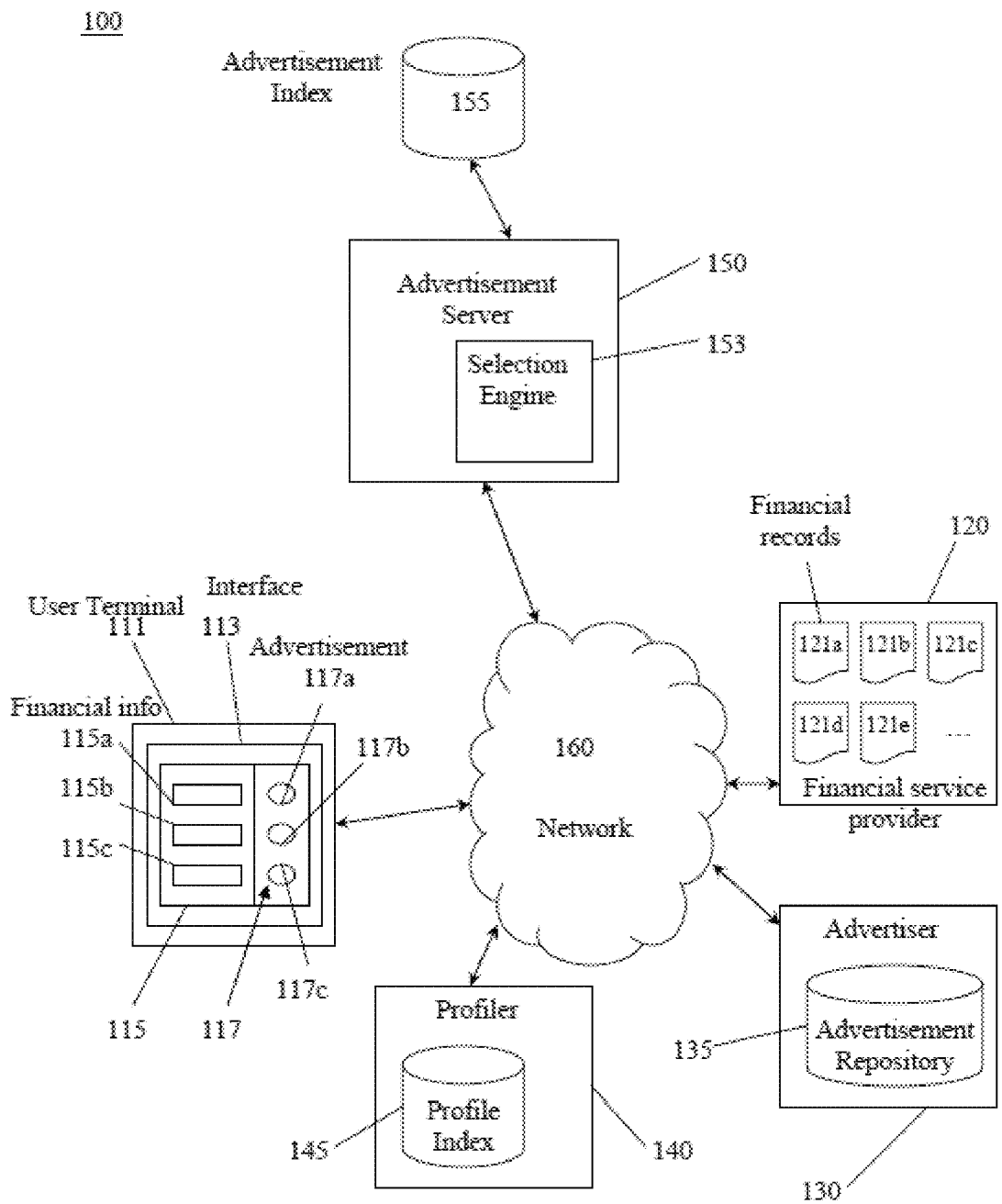
FIG. 1 is a diagram illustrating a system for distributing content, in accordance with certain exemplary embodiments.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements.

DETAILED DESCRIPTION

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, a skilled programmer would be able to write such computer programs to implement exemplary embodiments based on the flow charts and associated description in the application text. Therefore, disclosure of a particular set of program code instructions is not considered necessary for an adequate understanding of how to make and use the exemplary embodiments. Further, those skilled in the art will appreciate that one or more aspects described herein may be performed by hardware, software, or a combination thereof, as may be embodied in one or more computing systems.

Turning now to the drawings, in which like numerals represent like (but not necessarily identical) elements throughout the several figures, exemplary embodiments are described in detail. With reference to FIG. 1, a system 100 for distributing content can be used to distribute content to an individual based on an analysis of the individual's spending habits, as reflected in information obtained from the individual's receipts. The system 100 includes a user terminal 111, such as a personal computer, a mobile device (e.g., notebook computer, tablet computer, netbook computer, smartphone, or personal digital assistant ("PDA")), or another computing device, that includes an interface 113, such as an Internet browser program. The interface 113 is operable to display content and communicate with a financial service provider 120, such as a server computer hosting a web site through which access to account information is made available via a network 160, such as the Internet. The financial service provider can be, for example, a bank, a credit card issuer, a retailer, or another entity that maintains financial records 121a-121e that relate to users' accounts and reflect users' activity. For example, the financial records can include information regarding amounts, payee information, and payor information associated with credits and debits to the accounts. When a user wishes to review the user's account records, the user can request a display of financial information 115a-115c associated with the user's account in a first area 115 of the interface 113. The interface 113 can also display advertisements 117a-117c, or other selected content, in a second area 117 of the interface 113.

In order to provide advertisements or other content selections that are interesting to the user, an advertisement server 150 selects advertisements or other content for delivery to the user terminal 111 based on membership in one or more profiles associated with the user's account by matching the profile memberships and profile targeting information associated with available advertisements provided by advertisers, such as advertiser 130, or other providers of content for distribution. The memberships in various profiles associated with a user's account are identified by a profiler 140 through analysis of the account records of the user's account. The profile membership information for the account is maintained in a profile index 145 of the profiler 140. The profile targeting information that represents an association between available advertisements, such as text, audio, and/or video creatives, coupons, discounts, offers, or other content, and selected profiles is maintained in the advertisement index 155 of the advertisement server 150. The advertisements are maintained by the respective advertisers and can be stored in an advertisement repository 135, such as a storage device of a server computer of the advertiser 130.

Figures 8, 9:
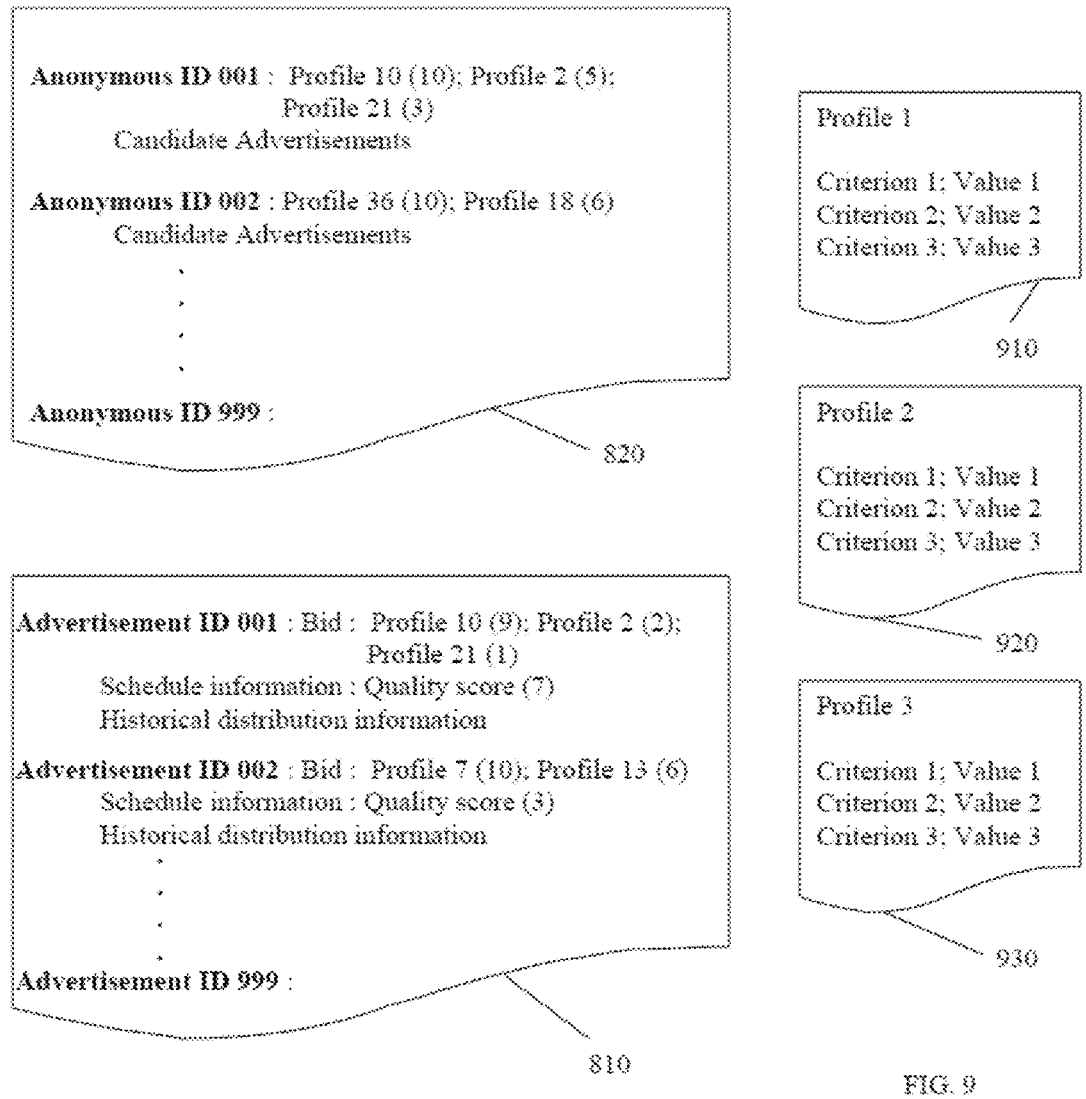
FIG. 8 is a diagram illustrating a data structure for storing associations with profiles, in accordance with certain exemplary embodiments.
FIG. 9 is a diagram illustrating data structures for storing profile information, in accordance with certain exemplary embodiments.

With reference to FIG. 9, the profiles include one or more membership criteria, such as values or ranges of values of selected parameters of activity, such as consumer spending activity, that are reflected in the account records 121a-121e. For example, documents 910-930 stored in the advertisement index 155 and the profile index 145 are associated with profiles 1-3. Each of documents 910-930 includes an indication of the profile with which it is associated, a list of the membership criteria 1-3 included in the profile, and an indication of a minimum confidence value required to satisfy each of the membership criteria.

By comparing the activity reflected in the account records with the membership criteria for a given profile, a determination can be made as to whether the activity satisfies all of the criteria, or a selected acceptable number or combination of criteria, such that membership in the profile should be indicated in the profile membership information associated with the account. For example, a "music fan" profile includes a membership criterion relating to a purchase of digital media in MP3 format, which is met when the account records for a user indicate that the user has purchased at least one MP3 download, such as a song purchase from ITUNES or AMAZON.COM within the preceding six month period. Other membership criteria included in the "music fan" profile include a membership criterion relating to concert ticket purchases, a membership criterion relating to music-related magazine subscriptions, and a membership criterion relating to purchase of musical instruments and/or accessories.

Thus, the profile membership criteria can be related to the specific goods and services purchased as reflected in the account records. The profile membership criteria can also be related to payments received, and/or the amounts, source, and/or the frequency of purchases or receipts. Additionally, profile membership criteria can relate to other aspects of the account records. For example, membership criteria can relate to whether purchases were made at retail locations or whether purchases were made electronically, such as on an electronic commerce web site. Similarly, membership criteria can relate to whether goods were purchased or whether services were purchased. Other profile membership criteria can relate to the type of payment method used to make purchases. Additionally, some profile membership criteria can relate to information inferred from the financial records. For example, product or service brand affinity or category affinity can be inferred from purchase records. Similarly, payment method affinity can be determined by comparing records of cash withdrawals to check payments and to automatic account debits.

As an additional example, records for an account that include check payments to a child day care service as well as frequent purchases at a retailer such as "BABIES R US" can be relied on to satisfy a membership criterion of parenthood, or other demographic or quasi-demographic membership criteria, separately from other demographic information associated with the account. For example, a billing address associated with an account can be used to determine a geographic location of an individual. Additionally, or alternatively, store locations where purchases are made can also be used, either alone or in combination with the billing address, to determine a geographic location of an individual. It is worth noting that even if the individual associated with the account is not a parent (or if an individual does not reside where purchases are frequently made), it may be effective to display advertisements or other content to the individual that is targeted to parents (or residents of a selected region). That is to say, even where the user doesn't match the profile membership criteria, or would not self-designate as a member of a profile, the user may be a good match for content targeted to the profile because the original account records on which the profile membership information is created reflect consumer spending habits that are believed to be strong indicators of interest and preference.

The associations between the user's account and the profiles indicated in the profile membership information of the account are identified by the profiler 140, which accesses the user's account records and determines, for each of the membership criteria, whether the membership criterion has been met, or not. If all of the membership criteria for a profile have been met, or if a predetermined number or combination of membership criteria of the profile have been met, the profiler 140 determines that an association between the user and the profile should be indicated in the profile membership information associated with the account. The profiler then stores an appropriate indication in profile index 145 that indicates that the account information supports membership in the profile. This type of analysis is performed for each profile in the system 100, and for each user's account records to create and/or update the profile index 145. Thus, the profile index 145 includes a list of accounts for which financial records are available, and the profile index 145 includes, for each account, profile membership information that indicates associations between the account and the profiles of the system 100. For example, in the example discussed above regarding the "music fan" profile, the account records that indicated that the user purchased MP3 downloads may also be used to determine that the user matches an "online shopper" profile, for which making purchases electronically is a criterion. Thus, the listing for the account includes an indication that the account is associated with both the "music fan" profile and the "online shopper" profile.

As mentioned above, in some implementations, a confidence value is included in the profile membership information. The confidence value is an indication of the strength of the match between the user's account records and the profile membership criteria. For example, if five of ten profile criteria are met, the profiler can include an indication that there is a strong match between the user and the profile, while a stronger match can be indicated if seven or more criteria are met, and a weaker match can be indicated if three or fewer criteria are met. No match is indicated if none of the criteria are met. In some implementations, other schemes can be used for determining that a user's account records match a profile, and for determining the strength of the match. For example, if a user's account records indicate that the user has spent, on average, an amount in excess of $100.00 per month for the last six months on MP3 downloads, then the profiler 140 can determine that there is a strong match to the "music fan" profile. Additionally, the profile index 145 can be based only on account records dated within a selected time range, such as within six months from the current time. This allows the profile membership information associated with an account to change over time, such as when an individual's spending habits change.

In some implementations, the profile index 145 also includes an anonymous identifier for each account that is arbitrary, or otherwise not capable of being used by a third party to identify the account to which the identifier relates or to identify the individual user associated with the account. Therefore, the identifiers included in the profile index 145 can be used within the system as anonymous identifiers of users. The anonymous identifiers can be replaced with new identifiers periodically to further enhance privacy protections.

The profile index 145 is updated at selected times, in order to account for changes to the account records as well as to account for changes to the profiles, such as when new profiles are added, or when the criteria for a profile are adjusted. For example, the profile membership information included in the profile index 145 can be updated periodically, such as once per week, when system usage is low. In some implementations, the profile index 145 is updated each time a new profile is added or each time the membership criteria of an existing profile are modified, including when profiles are deleted from the system 100.

In some implementations, one or more profiles can be defined by combinations of consumer spending information and other information, such as demographic information. For example, a "west coast music fan" profile can include the membership criteria included in the "music fan" profile discussed above, as well as a membership criterion based on the billing zip code of the user's account. Additionally, some profiles can include, as membership criteria, membership in two or more other profiles, such as the "music fan" profile and a "parent" profile that indicates that the user has at least one child. Thus, the profiles are very flexible and can be created to include membership criteria that target one or more attributes of a user with a desired degree of precision.

The profiles can be created and controlled by an administrator of the profiler 140, and profiles may be created and/or modified by other users of the system 100, such as an advertiser 130 and/or an administrator of the financial service provider 120. For example, advertisers may create and/or modify profiles in order to target individuals based on attributes that the advertisers perceive to be indicators of potential interest in the advertisers' goods and/or services. Similarly, an individual may wish to create a profile that targets selected ones of their own attributes that relate to goods and/or services for which they are interested in receiving information and/or promotions.

Although the profile index 145 has been described with reference to accounts, the profile index can additionally, or alternatively, include a listing of users, such that account records for multiple accounts each associated with a single individual can be linked or aggregated to provide more information regarding the individual's spending habits. For example, if an individual has two bank accounts with the same bank, the account records for each bank account can be associated with a single user identifier, such as the arbitrary anonymous identifier discussed above. Likewise, credit card accounts, lines of credit, mortgage accounts, and any other accounts maintained by the financial service provider 120 for the individual can be aggregated for use in determining the profile membership information for the user.

In some instances, the individual may have a joint account shared with another individual, such as the individual's spouse, child, business partner, or other person. In such instances, the activity from the joint account can be attributed to both individuals, to neither individual, or to one or both of the individuals based on a similarity between the activity and the activity of others of the individuals' accounts.

In addition to the profile index 145, the advertisement server 150 maintains an advertisement index 155, such as an electronic database stored in a computer-readable storage device, that includes profile targeting information that indicates associations between each of the profiles of the profile index 145 and advertisements which are provided by advertisers, such as the advertiser 130. For example, as illustrated in document 810 of FIG. 8, the advertiser 130 selects one or more profiles, or combination of profiles, to which the advertiser 130 wants to target, such that the advertisement is delivered to individuals whose account records include activity indicating desired consumer spending habits and/or preferences. Specifically, based on inputs provided by the advertiser 130, the advertisement server 150 records an indication of such selections in the advertisement index 155 for use in selecting an advertisement to display to a user. For example, an advertiser associated with advertisement 001 has selected to target advertisement 001 to individuals whose profile membership information includes profiles 10, 2, or 21. The advertiser associated with advertisement 002 has selected to target advertisement 002 to individuals whose profile membership information includes profiles 7 or 13.

The advertiser can also select various other parameters regarding the distribution of the advertisement, such as scheduling information, which includes the desired number of impressions and the time period in which the advertisement is to be delivered. Bid price information can also be selected. The bid price information includes information regarding an amount that the advertiser is willing to pay if the advertisement is displayed, an amount the advertiser is willing to pay if a user clicks-through the advertisement, or an amount the advertiser is willing to pay if a user purchases a product or service after clicking-through the advertisement. The advertisement server 150 can also include historical information in the advertisement index, such as information regarding previous selections of the advertisements, performance information, such as click-throughs, or other information.

The profile targeting information and the other distribution parameters, if provided, are used by the advertisement server 150 in selecting advertisements for delivery to an individual in response to a request for advertisements for the individual, as discussed in greater detail below. To manage the distribution of the advertisements, the advertisers can add and remove advertisements from the advertisement index, or modify the profile targeting information and/or other distribution parameters associated with an advertisement, as desired. For example, if the historical distribution information indicates that a cost per click for a given advertisement is higher than desired, the advertiser can remove the advertisement from the advertisement index 155, or modify the profile targeting information and/or the other distribution parameters to improve the performance of the advertisement. In some implementations, the advertisement server 150 can determine, based on the historical information, whether and how the profile targeting information and/or the other distribution parameters should be modified to improve the performance of an advertisement, or to achieve a desired value of one or more performance metrics.

In some implementations, as illustrated in document 820 of FIG. 8, the advertisement index 155 also includes a listing of the anonymous identifiers 001-999 associated with the accounts of system 100, such as 121*a*-121*e* of the financial service provider 120. The document 820 also includes, for each anonymous identifier, the profile membership information associated with the account, as determined by the profiler 140. This allows a selection engine 153, such as a computer processor executing computer-executable instructions, to select a desired number of advertisements from among advertisements 001-999 based on a request for advertisements that includes only the anonymous identifier associated with the account for which access is requested and the desired number of advertisements. For example, if an advertisement request is received by the advertisement server 150 for anonymous ID 001, the selection engine 153 identifies that advertisements targeted to profiles 10, 2, and 21 should be selected. The selection engine 153 then identifies candidate advertisements from among advertisement IDs 001-999 that are targeted to one or more of profiles 10, 2, and 21. The selection engine 153 can also identify candidate advertisements based on the confidence values included in the profile membership information for anonymous ID 001 and the minimum confidence levels included in the targeting information of the advertisements. For example, advertisement ID 001 may be selected as a candidate advertisement for a request for advertisements for anonymous ID 001 because the profile membership of anonymous ID 001 includes all of the same profiles as the profile targeting information of advertisement ID 001, and because the confidence values for each of the profiles included in the profile membership information of anonymous ID 001 equal or exceed the corresponding minimum confidence values included in the profile targeting information of advertisement ID 001.

However, the selection engine 153 can identify candidate advertisements without considering the confidence values of the profile membership information and the minimum confidence levels of the profile targeting information. Additionally, the selection engine 153 can identify as a candidate advertisement an advertisement ID whose profile targeting information includes any one (compared to all) of the profiles included in the profile membership information.

In some implementations, the advertisement index 155 does not include the document 820 that includes anonymous IDs, and the request for advertisements includes the profile membership information instead of the anonymous ID. In any case, the advertisement server 150 needs only to identify the one or more profiles for which advertisements should be selected.

After identifying the candidate advertisements based on the profile membership information of the user for which the advertisement request was generated and the profile targeting information of the advertisements, the selection engine 153 selects the desired number of advertisements from among the candidate advertisements. The selection of the desired number of advertisements can involve an auction system that chooses from among the candidate advertisements based on the bid information, the scheduling information, the historical distribution information, and/or quality information. The quality information can be generated, for example, based on an analysis of a landing web page (or destination web page) associated with the advertisement and/or an analysis of the advertisement with respect to the profile membership information. Thus, in some implementations, the selection of advertisements for distribution to an individual in response to an advertisement request balances advertiser's preferences, contextual relevance, revenue considerations, and/or advertisement quality considerations to select the best advertisements or other content to the individual.

Figure 6:
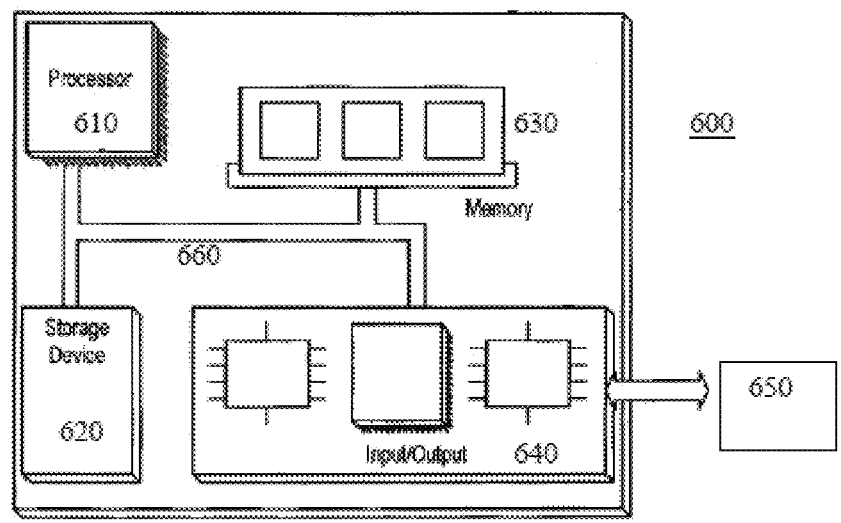
FIG. 6 is a diagram of a computer system operable in the systems of FIG. 1 and FIG. 10, in accordance with certain exemplary embodiments.

One or more of the components of the system 100, such as the user terminal 111, the financial service provider 120, the advertiser 130, the profiler 140, and/or the advertisement server 150, can include one or more computer systems, such as the computer system 600 of FIG. 6. The computer system 600 includes a processor 610, memory modules 630, a storage device 620, and an input-output module 640 connected by a system bus 660. The input-output module 640 is operable with one or more input and/or output devices 650, including a communication device for operable connection with the network 160 and with the other components of the system 100. The one or more computer systems 600 can perform the various functions of the components of the system 100 by executing computer-readable instructions, such as computer software stored on a computer-readable storage device.

Figure 2:
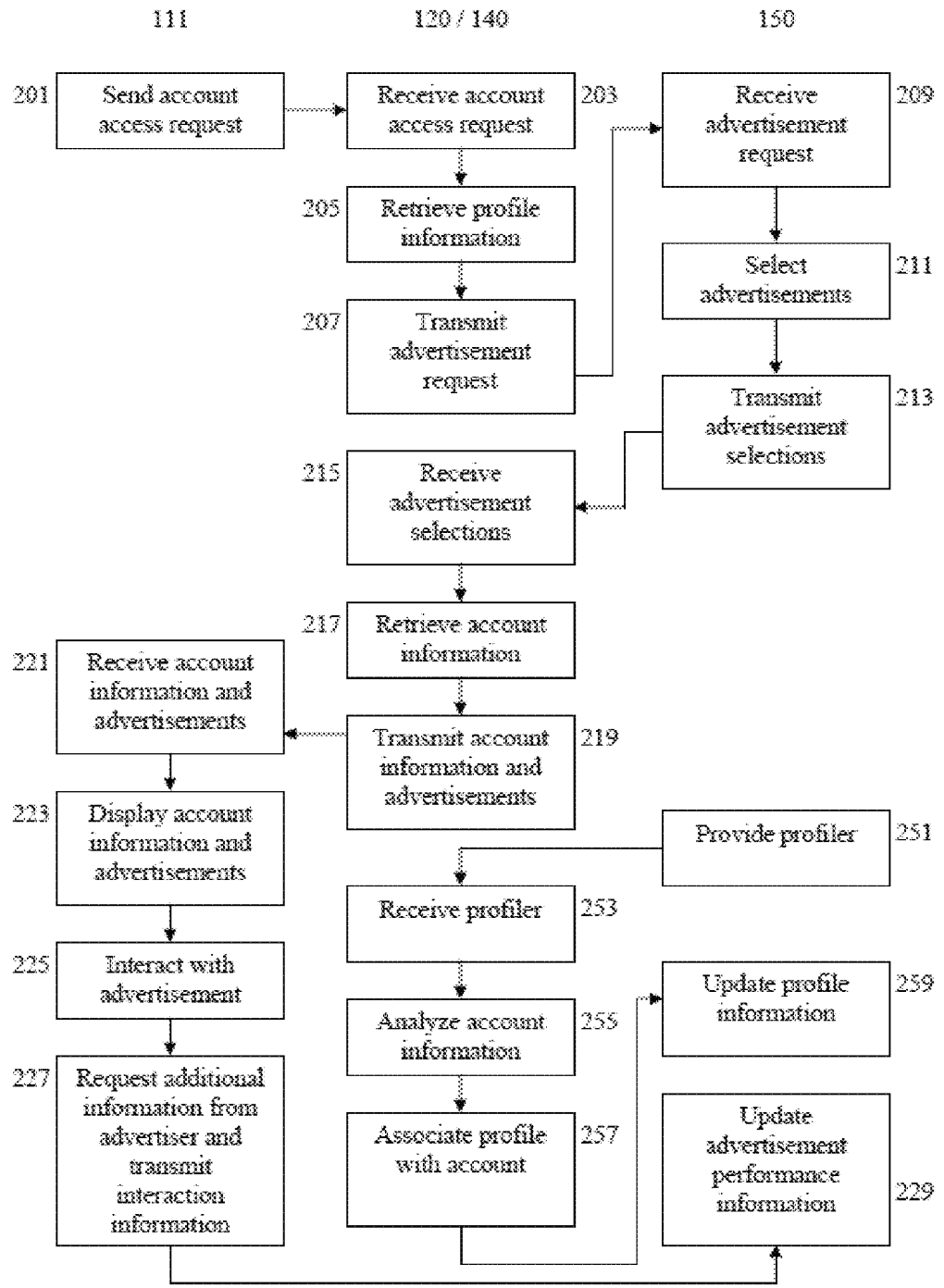
FIG. 2 is a diagram illustrating a process for distributing content, in accordance with certain exemplary embodiments.

In some implementations, as illustrated in FIG. 2, the system 100 is used to distribute content to users according to an example process 200. In the example process 200, an individual, using the user terminal 111, sends a request to the financial service provider 120 to access the individual's account records (201). For example, the individual may log in to a user interface, such as a web page on which account information is accessible. When the financial service provider 120 receives the request to access the individual's account records (203), the financial service provider 120 retrieves the profile membership information associated with the individual's account from the profile index 145 (205). The financial service provider 120 then transmits an advertisement request to the advertisement server 150 (207). The request includes an anonymous user identifier associated with the individual (or the individual's account) and/or the profile membership information associated with the individual (or the individual's account). The advertisement request can also include additional information, such as demographic information, or other information for use in selecting advertisements, such as historical performance information obtained from prior advertisement selections for the individual, as well as information regarding a number and type of advertisements to select.

When the advertisement server 150 receives the advertisement request (209), the selection engine 153 selects one or more advertisements from the advertisement index 155 based on the information contained in the advertisement request (211). For example, the selection engine 153 selects a desired number of advertisements having a desired format, based on the anonymous user identifier, profile membership information, demographic information, time and date information, performance information, and/or other information included in the advertisement request, such as brand affinity information, payment affinity information, and/or portal affinity information. The brand affinity information can include, for example an indication that the individual prefers one or more specific brands of goods or services that are associated with the profile membership information. For example, referring to the "music fan" profile, brand affinity information may indicate that the individual prefers iTunes and does not prefer Amazon.com. The payment affinity information can include an indication that the individual prefers to buy items with a DISCOVER credit card. This information can be used to select advertisements only for merchants that accept this type of credit card. Similarly, the payment affinity information could indicate that the individual frequently purchases gift cards, or that the user has deposited money in a prepaid account, such as a PAYPAL account, or a PLAYSTATION store account. Thus, advertisements for gift cards, advertisements for items in the PLAYSTATION store, or advertisements from merchants who accept PAYPAL may be preferred for distribution to the individual. The portal affinity information can include, for example, an indication that the individual prefers shopping at so called "brick and mortar" establishments. Thus, advertisements for stores in the vicinity of the individual's home, or advertisements for stores in the vicinity of locations where the individual frequently shops may be preferred.

The selection engine can also select the advertisements based on the information included in the advertisement index 155, such as the bid information or other information discussed above. As discussed above, in some implementations, the advertisement index 155 includes performance information for each of the advertisements that reflects the performance of each advertisement when selected for one or more of the profiles identified in the profile targeting information associated with the advertisement. Additionally, when the advertisement request includes the anonymous user identifier, the advertisement index 155 can include performance information specific to the individual associated with the current advertisement request, including previous advertisement selection information and/or historical interactions with previously-selected advertisements, such as click-throughs.

In some implementations, such as where an individual accesses the account records using a mobile device, such as an Internet enabled cellular phone handset that includes a GPS transceiver, the request can also include GPS information, or other time, date, and location information. The selection engine 153 can then select advertisements for stores that are in close geographic proximity, and which are contextually relevant to the current time at the location. Thus, advertisements for stores which are closed may not be selected. Similarly, advertisements for restaurants offering a special or other discount at the current time, such as an "early bird special" or a "happy hour" special may be favored.

After the advertisements have been selected by the selection engine 153, the advertisement server transmits information regarding the selected advertisements to the financial service provider 120 (213). For example, the advertisement selection information can include information that identifies the advertisement such that the financial service provider 120 or the user terminal 111 can retrieve a copy of the selected advertisements from the respective advertisers, such as from the advertisement repository 135 of the advertiser 130. Alternatively, copies of the advertisements can be stored in the advertisement index 155 and the advertisement selection information can include information sufficient to allow the financial service provider 120 to cause the advertisement to be displayed on the user terminal 111.

When the financial service provider 120 receives the advertisement selection information (215), the financial service provider 120 retrieves the requested account information (217). For example, if the individual has made a request to view all account activity for one account within the preceding thirty days, the financial service provider 120 retrieves such information from the appropriate ones of the account records 121*a*-121*e*. The financial service provider 120 then transmits the requested account information and the advertisement selection information to the user terminal 111 (219).

When the user terminal 111 receives the account information and the advertisement selection information (221), the user terminal 111 displays the account information and the selected advertisements to the individual (223). For example, as illustrated in FIG. 7A, the selected advertisements 117*a*-117*c* can be displayed together in an output display 700. The selected advertisements 117*a*-117*c* are displayed in a predetermined location 701 simultaneously with the account information 115*a*-115*c*, which are displayed in a nearby location 703. In some implementations, as illustrated in FIG. 7B, an output display 710 includes the advertisements 117*a*-117*c* displayed interspersed with the account information 115*a*-115*c*. For example, a text advertisement 117*a* for a coffee retailer is displayed on a line immediately below a line on which information 115*a* relating to a transaction with a competitor retailer is displayed. The text advertisement 117*a* optionally includes a hypertext link to a selected landing page. In another example, a printable or electronic coupon for a retailer can be displayed on a line immediately below a line on which information relating to a transaction with the retailer is displayed.

Other display formats and techniques can also be used, as desired by the individual, the financial service provider 120, the advertisement server 150 and/or the advertiser 130. For example, pop-up windows, pop-under windows, and/or banner ads, or other advertisement display formats can be used. Additionally, the advertisements can be displayed upon log out, or while the financial service provider retrieves the requested account information. In some implementations, the advertisements can be transmitted to the individual through electronic mail messages, text messages, by postal service, or through a dedicated promotional portion of the financial service provider's web site, such as a "promotions" page. Audio and/or video advertisements can be played by while the individual reviews the account information, such as when the account information display is rendered, or when the individual clicks on, or places a pointer over, a desired portion of the information (or other portion of the display). Similarly, text advertisements may be displayed when an individual clicks on or places a pointer over a desired portion of the output display of the user terminal 111.

Regardless of how the selected advertisements are displayed, when the individual interacts with an advertisement (225), such as by clicking on the display of the advertisement, the user terminal 111 transmits a request for additional information from the advertiser, such as by following a link to a web page selected by the advertiser, as well as transmits information regarding the interaction to the advertisement server 150 (227). For example, when an individual clicks on a displayed advertisement, the user terminal 111 may process HTML code that causes a new browser window to open with additional information relating to the request, such as a printable coupon, a display advertisement, or a selected page of the advertiser's web site. In some implementations, interacting with the advertisement can cause a change to an account of the individual with the advertiser, such as by adding an item for purchase to the individual's shopping cart of the advertiser's electronic commerce web site, or by applying a discount to one or more items in the individual's shopping cart (including items subsequently added to the shopping cart).

When the advertisement server 150 receives the information regarding the interaction with the advertisement, the advertisement server 150 updates the advertisement index 155, or other storage device, to indicate that the advertisement was activated (229). This information can be used for improving the performance of subsequent advertisement selections, for determining a fee to be charged to the advertiser 130, or for other purposes. Additionally, as discussed above, the profile index 145 can also include the information regarding the interaction with the advertisement (as well as information indicating that an advertisement was not activated after being displayed). Thus, the user terminal 111 can also transmit the information regarding the interaction to the profiler 140 and/or to the financial service provider 120.

In some implementations, the profiler 140 is provided to the financial service provider 120 by the advertisement server 150, or by another entity associated with the advertisement server 150 (251). This allows the advertisement server, or another entity that is experienced in content distribution, to create, update, and manage the profiles, and the software or hardware implementation of the profiler 140 while allowing for the profile index 145 to be created and updated by the financial service provider 120. Thus the profile index 145 can be created and updated without divulging any private information contained in the account records to any parties, while relieving the financial service provider of the burden of the profiler creation and maintenance duties. When the financial service provider 120 receives the profiler 140 (253), the financial service provider 120 operates the profiler 140 to analyze the account information for each account (255). Based on the analysis, the profiler 140 associates the accounts with the profiles whose criteria are met by the account information by storing the profile membership information for each account (257). If the advertisement index 155 maintained by the advertisement server 150 includes some of the profile membership, such as the indications of associations between the profiles and anonymous identifiers, then the profiler 140 also transmits updated information regarding the profile membership information and the anonymous identifiers to the advertisement server 150, which then updates the profile membership information in the advertisement index 155 (259).

In some implementations, the profiler can be created and/or maintained by the financial service provider 120, or by the advertiser 130. Additionally, some or all of the features and functions described above with respect to the advertisement server 150 can be performed by another entity, including the financial service provider 120, if desired. Regardless, the use of the pre-selected profile membership criteria, and the separation of the account records from the advertiser 130 and other entities, allows targeting of content for distribution based on the profile membership information without revealing the information contained in the account records.

As discussed elsewhere in this disclosure, the anonymous identifiers are not necessary. In some implementations, profile membership information is included in the request for an advertisement or other content, and the selection engine 153 can select advertisements based on the profile membership information, and the profile targeting information stored in the advertisement index 155, without using the anonymous identifier that represents the account.

However, to the extent that an account identifier is provided to the advertisement server, various additional features can be enabled. For example, if the anonymous identifiers are stored in the advertisement index along with profile membership information, the advertisement server can pre-select advertisements for distribution to the individual associated with an anonymous identifier. This allows advertisements or other content to be provided to the user with less delay from the time of a request for account access. Additionally, use of the anonymous identifiers allows the advertisement server to better track performance of advertisement selections. This can enable better quality advertisement selections to be made for individuals such that the individuals and the advertisers will be more satisfied with the distribution of the advertisements.

Figure 3:
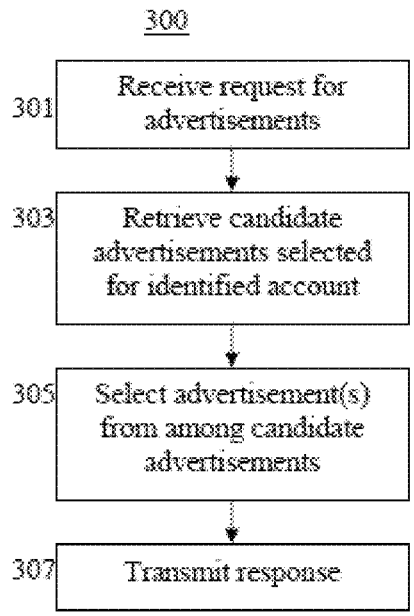
FIG. 3 is a diagram illustrating a process for selecting content for distribution, in accordance with certain exemplary embodiments.

In some implementations, as illustrated in FIG. 3, advertisements are distributed by the advertisement server 150 according to an example process 300. For example, steps 209-213 of the process 200 of FIG. 2 can include the process 300. The content distribution process 300 begins when a request for an advertisement, or other content, is received by the advertisement server 150 (301). The advertisement request includes an account identifier, such as an anonymous identifier that is associated with an account for which access has been requested by an individual. The advertisement server 150 retrieves candidate advertisements previously identified as being targeted for distribution to an individual associated with the anonymous identifier (303) and selects one or more advertisements from among the retrieved candidate advertisements for distribution to the individual that requested access to the account (305).

In some implementations, the advertisement server 150 retrieves all candidate advertisements previously identified as being targeted for distribution to the individual associated with the anonymous identifier, and selects a number of advertisements indicated in the request for an advertisement from among the candidate advertisements. Thus, in the case where the advertisement request originates at the financial service provider 120, the number of advertisements distributed to the individual can be controlled by the financial service provider 120 by including an indication of the desired number of advertisements in the advertisement request. As discussed above, the candidate advertisements can be predetermined before the advertisement request is received, based on a comparison of the profile membership information associated with the anonymous identifier with the profile targeting information associated with the available advertisements. Thus, retrieving the candidate advertisements includes retrieving a list of pre-selected advertisements associated with the anonymous identifier in the advertisement index 155. Therefore, retrieving the candidate advertisements can be performed very quickly in response to the request for advertisements. However, in some implementations, the comparison of the profile membership information associated with the anonymous identifier with the profile targeting information associated with the available advertisements (or a comparison of the profile membership information included in the advertisement request with the profile targeting information associated with the available advertisements) to identify the candidate advertisements is performed after receiving the advertisement request.

In a simple example, only advertisements that include profile targeting information that includes all of the profiles included in the profile membership information associated with the anonymous identifier (or included in the advertisement request) are selected as candidate advertisements for distribution in response to an advertisement request for the anonymous identifier. In some implementations, other selection criteria can be used to identify the candidate advertisements. For example, in some implementations, all advertisements that include profile targeting information that includes any one of the profiles included in the profile membership information associated with the anonymous identifier can be identified as candidate advertisements.

Regardless of how the candidate advertisements are selected for the anonymous identifier (or the advertisement request), the selection engine 153 selects from among the candidate advertisements to determine the advertisement(s) that are distributed to the individual in response to the advertisement request. In some implementations, an auction, such as a second-price weighted ranking auction, can be used. For example, for each of the candidate advertisements, a quality score is combined with a bid price to determine a bid score for the advertisement, and the selection engine 153 selects the advertisements with the highest bid score first, until a number of available advertisements slots, such as a number included in the request, have been filled. The advertiser associated with each selected advertisements is charged only an amount necessary to obtain a bid score greater than or equal to the bid score or the next highest scoring advertisement.

The quality score indicates a perceived strength of a match between the candidate advertisement and the individual to whom the advertisement will be displayed, if selected. The bid score can be determined, for example, by a comparison of the profile targeting information and the profile membership information. A one-to-one correspondence can correspond to a highest possible quality score, and non-matching profiles included in the profile targeting information or in the profile membership information can result in a lower quality score. Of course, the quality score can be determined according to different processes, as desired. For example, as mentioned above, the quality score can be based on an analysis of a document to which the advertisement refers, such as a landing page of a hypertext link included in the advertisements. In some implementations, the quality score is always a positive number or fraction, and the bid score is obtained by multiplying the bid amount in dollars and the quality score. Thus, a higher quality advertisement may be selected even though a lower dollar amount is bid (or charged, due to the second-price feature).

In some implementations, other types of auctions can be used to select advertisements, or other content, for distribution in response to a request. In other implementations, non-auction selection processes can be used. Regardless of the specific process used to select one or more advertisements from among the retrieved candidate advertisements, the advertisement server 150 transmits a response to the request for an advertisement (307). The response can include copies of the selected advertisements themselves for rendering by the user terminal 111. Additionally or alternatively, the response can include one or more indications of a source of the selected advertisements. Thus, if the advertisement creatives are maintained in the advertisement repository 135, the response can include a link or other navigational tool operable to cause the user interface 113 to retrieve the selected advertisements directly from the advertiser 130.

Figure 4:
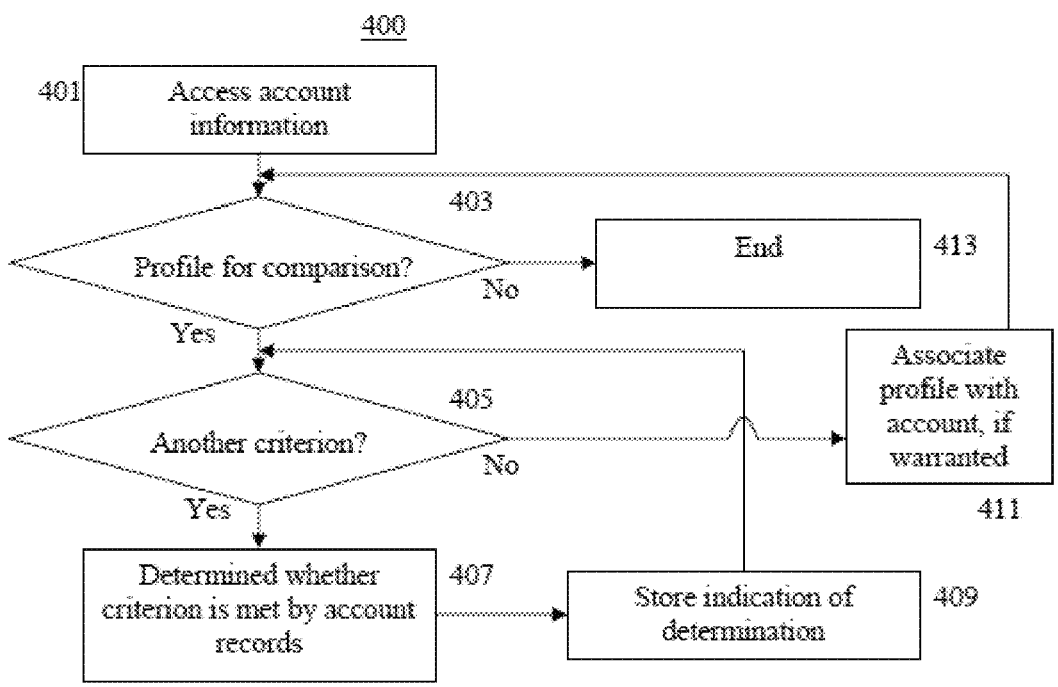
FIG. 4 is a diagram illustrating a process for determining profile associations for a user based on account information, in accordance with certain exemplary embodiments.

As illustrated in FIG. 4, the profile membership information for each account can be determined according to an example process 400, which can be used, for example, in steps 255-257 of the process 200 of FIG. 2. The example process 400 begins by accessing account information, such as the account records 121a-121e of FIG. 1 (401). A determination is then made by the profiler 140 as to whether a profile exists whose membership criteria needs to be compared to the account information (403). For example, when the profiler 140 is activated, the profiler 140 can sequentially compare the membership criteria of each profile in a list of available profiles with the account information. After comparing a first profile in the list of available profiles, the profiler 140 can compare the membership criteria of a second profile in the list, and so on, until the membership criteria of all of profiles in the list of available profiles have been compared to the account information.

If a profile needs to be compared to the account information, a determination is made regarding whether at least one membership criterion of the profile needs to be checked against the account information (405). If a membership criterion needs to be checked against the account information, a determination is made regarding whether or not the membership criterion is met by the account records (407) and an indication of whether or not the membership criterion is met is stored, such as in a temporary storage device (409). Then, another determination is made regarding whether an additional membership criterion needs to be checked against the account information (405). This process loop continues until all of the membership criteria of the profile have been checked. When a determination is made that no more membership criteria need to be checked, a determination can be made regarding whether a sufficient number or combination of membership criteria have been met to warrant including the profile in the profile membership information associated with the account. If inclusion of the profile in the profile membership information is warranted, an indication of an association between the profile and the account is made in the profile membership information stored in the profile index 145.

The process 400 then returns to determine whether another profile needs to be compared to the account information. If another profile needs to be compared, steps 405-411 are repeated as necessary. When no other profile needs to be compared to the account information, the process 400 ends (413).

If performed by the profiler 140 of FIG. 1, a complete profile index 145 can be created by the process 400. In some implementations, however, other processes can be used to create the profile index 145.

Figure 5:
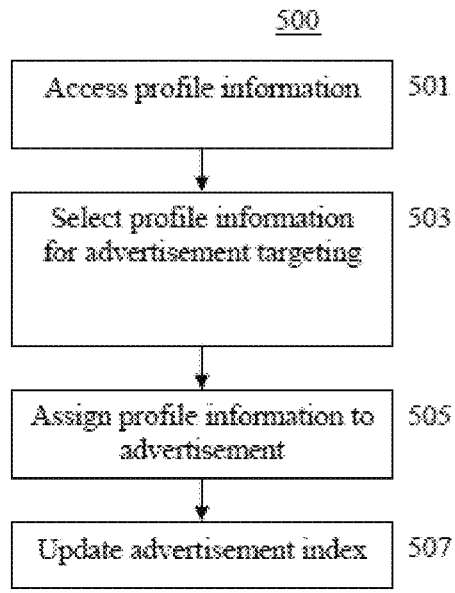
FIG. 5 is a diagram illustrating a process for targeting content based on profile information, in accordance with certain exemplary embodiments.

Now referring to FIG. 5, the advertiser 130 can perform an example process 500 for targeting content for distribution to individuals based on profile membership. According to the process 500, the advertiser 130 accesses the profiles, such as by accessing documents 910-930, or by accessing a list of available profiles (501). In some implementations, the advertiser can access the profile information through an advertiser interface that provides a list of all profiles. Information regarding the membership criteria included in each profile can also be accessed through the advertiser interface such that the advertiser 130 can decide which profiles target individuals whose accounts include desired attributes. The advertiser 130 selects the profiles that include the desired attributes (503) and assigns the selected profiles to the advertisement (505) by inputting the selected profiles using the advertiser interface. Then the advertisement index 155 is updated to reflect the assigned selections by updating the profile targeting information associated with the advertisement (507). For example, for advertisement ID 001, the advertiser 130 selected profiles 10, 2, and 21 as the profiles to which the advertiser wants the advertisement to be targeted.

Additionally, other information, such as the bid information and/or the scheduling information, can be selected by the advertiser 130 and stored in the advertisement index 155 for use in selecting advertisements to provide to a user in response to an advertisement request. Similarly, other selection criteria can be provided by the advertiser. For example, the advertiser can choose the specific process for determining whether the advertisement should be selected as a candidate advertisement for a given anonymous identifier or a given advertisement request and/or whether the advertisement should be selected for distribution in response to a given request. In one example, the advertiser can choose to only allow the selection engine 153 to select the advertisement, either as a candidate advertisement or for distribution in response to a request, where the profile membership information is a perfect match with the profile targeting information selected by the advertiser. In another example, the advertiser can choose a minimum confidence value for one or more selected profiles such that the selection engine 153 can select the advertisement only if the confidence values included in the profile membership information meets or exceeds the minimum confidence value. In some implementations, the advertiser 130 can specify a minimum number of profile matches between the profile membership information and the profile targeting information, and the advertiser 130 can designate one or more of the profiles as mandatory such that the advertisement is selected only where the profile membership information includes the designated profiles, regardless of the number of other matching profiles between the profile membership information and the profile targeting information.

While some implementations are described above, these should not be viewed as exhaustive or limiting, but rather should be viewed as exemplary, and included to provide descriptions of various features. It will be understood that various modifications may be made without departing from the spirit and scope of this disclosure. For example, the financial service provider discussed above can also perform the functions of the advertisement server described. As such, any signal that triggers selection of an advertisement or other content for display to an individual can be considered to be a request for an advertisement, even if the signal is internal to a single computer system that both retrieves requested account information and selects advertisements. Similarly, any signal that triggers display of account information to a user can be considered to be a request for account information. For example, a mobile device may include a feature that allows financial information to be viewed. In this example, accessing this feature can be considered to be a request for financial information.

Additionally, the financial service provider 120 can be any entity that maintains financial records. As such, the financial service provider 120 can include banks and credit card issuing entities, as mentioned above, as well as retailers that retain account records of customer purchases, returns, and/or loans, and aggregators of financial information, such as automatic bill payment services, accounting services, and/or financial management services. Similarly, the functions of the financial service provider 120 can be performed by the advertisement server. For example, an individual who desires to receive targeted content, including advertisements and other offers can provide financial records of one or more accounts to the advertisement server in order to provide a greater amount of financial information from which to determine appropriate profiles. In this case, the individual retains control of which accounts are supplied to the advertisement server, such that information that the user wishes to keep private can be withheld from the advertisement server. Additionally, all of the individual's account records can be kept private from the advertisers such that the advertiser's cannot contact the individual outside of the system 100 based on the provided account records unless the individual allows such contact and disclosure of information.

Figure 10:
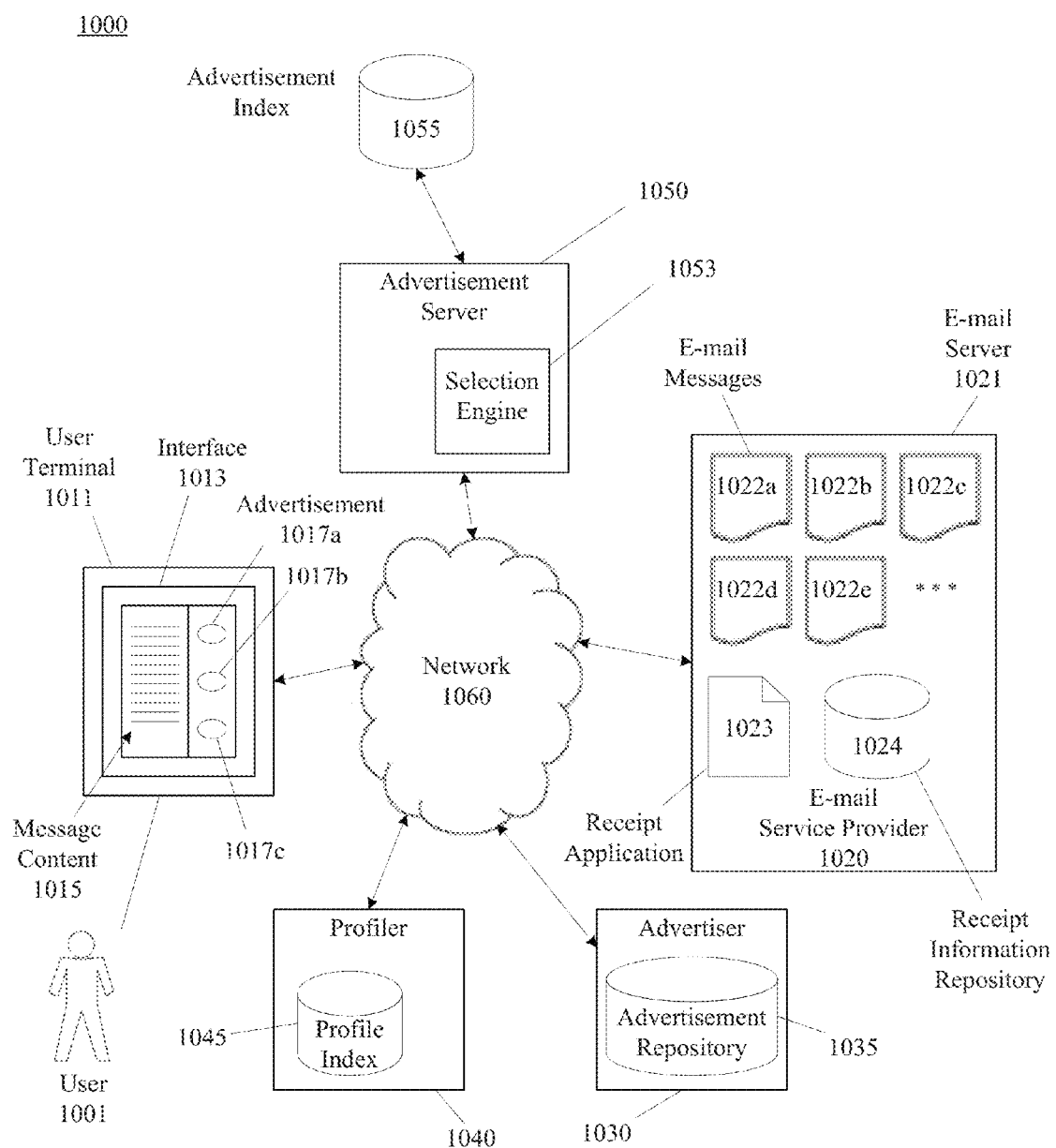
FIG. 10 is a diagram illustrating a system for distributing content, in accordance with certain exemplary embodiments.

FIG. 10 is a diagram illustrating a system 1000 for distributing content, in accordance with certain exemplary embodiments. Referring to FIG. 10, the system 1000 can be used to distribute content to a user 1001 based on an analysis of the user's spending habits, as reflected in information obtained from the user's receipts. The system 1000 includes a user terminal 1011, such as a personal computer, a mobile device (e.g., notebook computer, tablet computer, netbook computer, smartphone, PDA, video game device, or GPS locator device), or any other wired or wireless processor-driven device. The user terminal includes an interface 1013, such as an Internet browser program (e.g., MICROSOFT INTERNET EXPLORER) or an e-mail application (e.g., MICROSOFT OUTLOOK), or any other software application or hardware device used to render content. The interface 1013 is operable to display content and communicate with an e-mail server 1021 of an e-mail service provider 1020 via a network 1060. The network 1060 can include a local area network ("LAN"), a wide area network ("WAN"), an intranet, a mobile phone network, the Internet, and/or any combination of the aforementioned networks.

The e-mail server 1021 provides e-mail functionality for users 1001 having an e-mail account with the e-mail service provider 1020. In certain exemplary embodiments, the e-mail service provider 1020 is a Web-based e-mail service provider, such as GOOGLE GMAIL, YAHOO MAIL, etc. In such embodiments, the e-mail server 1021 may be a Web-based e-mail server. In certain alternative exemplary embodiments, the e-mail server 1021 may be a general purpose server used to provide e-mail functionality within an intranet, such as an enterprise WAN.

The user 1001 may compose an e-mail message 1022a-1022e using the interface 1013. After the user 1001 indicates that the composed e-mail message should be sent, the user terminal 1011 transmits the composed e-mail message to the e-mail server 1021, which in turn, transmits the e-mail message to the recipient or to an e-mail server associated with the recipient's e-mail account. Similarly, the user 1001 may access received (or sent or drafted) e-mail messages 1022a-1022e stored on the e-mail server 1021 using the interface 1013. In addition or in the alternative, the e-mail messages 1022a-1022e may be stored on the user terminal 1011 or at another networked computer of storage device.

In the illustrated embodiment, the e-mail server 1021 also includes a receipt application 1023 and a receipt information repository 1024. The receipt application 1023 is operable to scan e-mail messages 1022a-1022e received at the e-mail server 1021 to identify receipts, such as payment receipts, included in the e-mail messages 1022a-1022e. For example, many merchants provide a payment receipt via e-mail for transactions completed online or at retail store locations if the merchant has access to a consumer's e-mail address. The receipt application 1023 may scan e-mail messages as the messages are received or at pre-configured intervals. The receipt application 1023 is also operable to learn the structure of receipts included with e-mails by performing a machine learning algorithm on receipts obtained from one or more users' e-mail messages.

The receipt application 1023 can extract information from identified receipts and store the extracted information in the receipt information repository 1024 for access by a profiler 1045. This receipt information can include information regarding products or services included in the receipt (e.g., name, brand, category or type of product or service, product description, quantity or number of units purchased, price per unit, etc.), the total amount for the receipt, source of payment, type of payment method used, date of purchase, the name or type of merchant, the delivery method and/or entity used for delivery if a product was shipped to the user 1001, whether the purchase was completed in a store location or electronically (e.g., via the Internet or telephone), and the geographic location of the store location where the purchase was completed. As described in further detail below, the information obtained from the user's receipts can be used to target content, such as advertisements, coupons, discounts, training videos, product brochures, or other promotional material, to the user 1001.

The receipt application 1023 can identify e-mail messages that include receipts in a variety of ways. In certain exemplary embodiments, the receipt application 1023 identifies receipts in e-mail messages by identifying words, phrases, or other information contained within the e-mail message (e.g., within the subject line and/or within the e-mail message body) and/or within attachments to the e-mail message that would identify the e-mail message as containing a receipt. For example, terms such as payment, receipt, purchase, transaction, order, billing, shipping, shipped, total, number, or symbols that represent a currency, such as "$," may indicate that the e-mail message contains a receipt. In addition, a receipt identification number or a presence of a dollar amount may be used to identify a receipt.

In certain exemplary embodiments, the receipt application 1023 utilizes information identifying the sender of the e-mail message to determine whether the e-mail message contains a receipt. For example, certain online merchants are known to transmit receipts via e-mail, such as Amazon and eBay. E-mail messages sent to the user 1001 from one of these senders may be flagged for further processing. This further processing may include searching for information contained in the e-mail message as discussed above. In addition or in the alternative, the further processing may be completed by an administrator or other human actor.

In certain exemplary embodiments, the interface 1013 allows the user 1001 to identify receipts in the e-mail messages. For example, the interface 1013 may include a checkbox or link displayed within or adjacent e-mail messages that the user 1001 can select to identify the e-mail message as having a receipt. In another example, the interface 1013 may allow the user 1001 to identify e-mail senders that commonly send receipts to the user 1001.

The receipt information repository 1024 can store the identified receipts and/or information extracted from the receipts. The receipt information for each user 1001 having an account with the e-mail service provider 1020 may be stored in a separate file or data structure such that the user's receipt information remains separate from other users' receipt information. In addition or in the alternative, the receipt information may include an identifier, such as an anonymous identifier, that identifies the user 1001 or the e-account from which the receipt information was obtained. The receipt information for each identified receipt can be stored as separate entries in the receipt information repository 1024. This allows the system 1000 to determine how often a product or service is purchased and also allows the system 1000 to track a user's purchases over a time period. This also allows the system to 1000 to file the receipt information by date. For example, content may be targeted to a user 1001 using information from receipts received in the previous six months only.

In certain exemplary embodiments, the user 1001 may have the opportunity to opt-in or opt-out of receiving content based on their receipt information. If the user 1001 opts-out, then the e-mails received by that user 1001 may not be scanned to identify receipts and receipt information may not be stored for that user 1001. In addition, user 1001 may have the option to opt-in or opt-out of the type of content received. For example, the user 1001 may select to receive coupons or informative content, such as brochures or videos containing product or service information, while opting-out of receiving advertisements.

In order to provide advertisements, discounts, coupons, or other content selections that are interesting to the user 1001, an advertisement server 1050 selects advertisements or other content for delivery to the user terminal 1011 based on membership in one or more profiles associated with the user 1001 or with the user's e-mail account. In certain exemplary embodiments, the advertisement server 1050 selects content by matching the profile memberships of the user 1001 with profile targeting information associated with available advertisements provided by advertisers, such as advertiser 1030, or other providers of content for distribution. The memberships in various profiles associated with a user 1001 are identified by a profiler 1040 through analysis of receipts for transactions completed by the user 1001. In certain exemplary embodiments, this analysis also may include the account records as described above with reference to the system 100 illustrated in FIG. 1.

The profile membership information for the user 1001 is maintained in a profile index 1045 of the profiler 1040. The profile targeting information that represents an association between available content, such as text, audio, and/or video advertisements, coupons, discounts, offers, product brochures, training videos, or other content, and selected profiles is maintained in the advertisement index 1055 of the advertisement server 1050. In certain exemplary embodiments, the content is maintained by the respective content provider and can be stored in the advertisement repository 1035, such as a storage device of a server computer of the advertiser 1030.

As described above with reference to FIG. 9, the profiles include one or more membership criteria, such as values or ranges of values of selected parameters of activity, such as consumer spending activity, that are reflected in the user's receipts. The membership criterion can be related to specific products or services purchased, the total purchase amount, source of payment, type of payment method used, the frequency of purchases, the name and type of merchant, delivery methods, geographic location or store location where the transaction was completed, whether the transaction was completed via the Internet, or to any other information that can be obtained from receipts. For example, brand, merchant, and/or payment method affinity can be inferred or predicted using receipt information.

By comparing the activity reflected in the user's receipts (and optionally from the account records of the user 1001) with the membership criteria for a given profile, a determination can be made as to whether the activity satisfies all of the criteria, or a selected acceptable number or combination of criteria, such that membership in the profile should be indicated in the profile membership information associated with the user 1001. For example, a "music fan" profile includes a membership criterion relating to a purchase of digital media in MP3 format, which is met when the information obtained from one or more of the user's receipts indicate that the user 1001 has purchased at least one MP3 download, such as a song purchase from ITUNES or AMAZON.COM within the preceding six month period. Other membership criteria included in the "music fan" profile include a membership criterion relating to concert ticket purchases, a membership criterion relating to music-related magazine subscriptions, and a membership criterion relating to purchase of musical instruments and/or accessories.

In certain exemplary embodiments, the system 1000 includes a product information module (not shown) that obtains information regarding products stored on the user terminal 1011. This product information module may be stored on and executed by the user terminal 1011, the e-mail server 1021, or another server or device. The product information module searches the user terminal 1011 for products, such as music, movies, television shows, audio books, electronic books, games, applications, and recorded audio messages (e.g., radio, Internet or television broadcasts or shows). The product information module extracts information from the found products, such as title, author, artist, genre, and application type. This product information obtained from products stored on the user terminal 1011 can be used in addition to or in alternative of the receipt information to determine whether the user 1001 should be a member of a profile.

Thus, the profile membership criteria can be related to the specific goods and services purchased as reflected in the user's receipts, account records, products stored on a user terminal, and/or other sources. The profile membership criteria can also be related to payments received, and/or the amounts, source, and/or the frequency of purchases or number of units purchased. Additionally, profile membership criteria can relate to other aspects of the user's receipts. For example, membership criteria can relate to whether purchases were made at retail locations or whether purchases were made electronically, such as on an electronic commerce web site. Similarly, membership criteria can relate to whether goods were purchased or whether services were purchased. Other profile membership criteria can relate to the type of payment method used to make purchases. Additionally, some profile membership criteria can relate to information inferred from the user's receipts. For example, product or service brand affinity or category affinity can be inferred from purchase receipts. Similarly, payment method affinity can be determined by comparing check payments to payment card payments. Additionally, the payment method affinity may be determined based on the type of payment card used, such as debit card, credit card, type of credit card, or payment using reward points or frequent flyer miles.

As an additional example, a user 1001 that has receipts for payments to a child day care service as well as for payments at a retailer such as "BABIES R US" can be relied on to satisfy a membership criterion of parenthood, or other demographic membership criteria, separately from other demographic information associated with the user 1001. For example, a shipping address associated with the user 1001 can be used to determine a geographic location of the user 1001. Additionally, or alternatively, the user's address may be associated with the user's e-mail account. For example, the user 1001 may have provided a residential address during the initialization of the e-mail account. Further, the user's location may be determined based upon where the user 1001 is accessing e-mail messages. For example, the user terminal 1011 may include a GPS transceiver that identifies the user's geographic location. Or, the user terminal 1011 may be associated with an Internet Protocol ("IP") or Media Access Control ("MAC") address that identifies the location of the user terminal 1011.

The associations between the user 1001 and the profiles indicated in the profile membership information of the user 1001 are identified by the profiler 1040, which accesses the user's receipts (and optionally account information and/or product information obtained from the user terminal 1011) and determines, for each of the membership criteria, whether the membership criterion has been met or not. If all of the membership criteria for a profile have been met, or is a predetermined number or combination of membership criteria of the profile have been met, the profiler 140 determines that an association between the user 1001 and the profile should be indicated in the profile membership associated with the user 1001. The profiler 1040 then stores an appropriate indication in profile index 1045 that indicates that the user's receipt information supports membership in the profile. This type of analysis is performed for each profile in the system 1000, and for the information obtained from the user's receipts to create and/or update the profile index 1045. Thus, the profile index 1045 includes, for each user 1001, profile information that indicates associations between the user 1001 and the profiles of the system 1000. Additionally, or alternatively, the profile index 145 may include, for each e-mail account for each user 1001, profile information that indicates associations between the e-mail account and the profiles of the system 1000. For example, in the example discussed above regarding the "music fan" profile, the information obtained from the user's receipts that indicated that the user 1001 purchased MP3 downloads may also be used to determine that the user 1001 matches an "online shopper" profile, for which making purchases electronically is a criterion. Thus, the listing for the user 1001 (or the e-mail account) includes an indication that the user 1001 (or the e-mail account) is associated with both the "music fan" profile and the "online shopper" profile.

As mentioned above, in some implementations, a confidence value is included in the profile membership information. The confidence value is an indication of the strength of the match between the information obtained from the user's receipts (and optionally account information and/or product information obtained from the user terminal 1011) and the profile membership criteria. For example, if five of ten profile criteria are met, the profiler 1040 can include an indication that there is a strong match between the user 1001 and the profile, while a stronger match can be indicated is sever or more criteria are met, and a weaker match can be indicated if three or fewer criteria are met. No match is indicated if none of the criteria are met. In certain exemplary embodiments, other schemes can be used for determining that information obtained from a user's receipts (and optionally account information and/or product information obtained from the user terminal 1011) match a profile, and for determining the strength of the match. For example, if the information obtained from the user's receipts indicate that the user 1001 has spent, on average, an amount in excess of $100.00 per month for the last six months on MP3 downloads, then the profiler 1040 can determine that there is a strong match to the "music fan" profile. Additionally, the profile index 1045 can be based only on a user's receipts (and optionally account information and/or product information obtained from the user terminal 1011) dated within a selected time range, such as within six months from the current time. This allows the profile membership information associated with a user 1001 to change over time, such as when an individual's spending habits change.

In certain exemplary embodiments, the profile index 1045 also includes an anonymous identifier for each user 1001 and/or each e-mail account for each user 1001. This anonymous identifier may be arbitrary, or otherwise not capable of being used by a third party to identify the user 1001 (or e-mail account) to which the identifier relates or to identify the user 1001. Therefore, the identifiers included in the profile index 1045 can be used within the system 1000 as anonymous identifiers of users 1001. The anonymous identifiers can be replaced with new identifiers periodically to further enhance privacy protection.

In certain exemplary embodiments, the profile index 1045 is updated at selected times, in order to account for new receipts as well as to account for changes to the profiles, such as when new profiles are added, or when criteria for a profile are adjusted. For example, the profile membership information included in the profile index 1045 can be updated periodically, such as once per week, when system usage is low. In certain exemplary embodiments, the profile index 1045 is updated each time a new profile is added or each time the membership criteria of an existing profile are modified, including when profiles are deleted from the system 1000. In certain exemplary embodiments, the profile index 1045 is updated each time a new receipt for a user 1001 is identified and information from the new receipt is obtained. In certain exemplary embodiments, the profile index 1045 is updated each time a certain number of receipts for a user 1001 are identified. For example, the profile index 1045 may be updated for every five receipts identified for the user 1001.

In certain exemplary embodiments, one or more profiles can be defined by combinations of consumer spending information and other information, such as demographic information. For example, a "west coast music fan" profile can include the membership criteria included in the "music fan" profile discussed above, as well as membership criterion based on the billing zip code or shipping address of the user 1001. Additionally, some profiles can include, as membership criteria, membership in two or more other profiles, such as the "music fan" profile and a "parent" profile that indicates that the user 1001 has at least one child. Thus, the profiles are very flexible and can be created to include membership criteria that target one or more attributes of a user 1001 with a desired degree of precision.

The profiles can be created, modified, and controlled by an administrator of the profiler 1040, and profiles may be created and/or modified by other users of the system 1000, such as an advertiser 1030 and/or an administrator of the e-mail service provider 1020. For example, advertisers may create and/or modify a profile in order to target individuals based on attributes that the advertisers perceive to be indicators of potential interest in the advertisers' goods and/or services. Similarly, an individual may wish to create a profile that targets selected ones of their own attributes that relate to goods and/or services for which they are interested in receiving information and/or promotions.

Although the profile index 1045 has been described largely in terms of users 1001 or of an e-mail account of the user 1001, the profile index 1045 can additionally, or in the alternative, include a listing of e-mail accounts for the user 1001, such that the receipts for multiple e-mail accounts can be linked or aggregated to provide more information regarding the user's spending habits. For example, is a user 1001 has two e-mail accounts with the same e-mail service provider 1020 (or with separate e-mail providers, each of which are associated with the profiler 1040), the user's receipts for each e-mail account can be associated with a single user identifier, such as the arbitrary anonymous identifier discussed above.

In some instances, an individual may have a joint e-mail account shared with another individual, such an individual's spouse, child, business partner, or other person. In such instances, the receipts from the joint e-mail account can be attributed to both individuals, to neither individual, or to one of the individuals. For example, if a name of one of the individual's is included in a receipt sent to the joint e-mail account, that receipt can be attributed to that individual. In another example, the joint e-mail account may be a member of one or more profiles based on the receipts received at that e-mail account.

In addition to the profile index 1045, the advertisement server 1050 maintains an advertisement index 1055, such as an electronic database stored in a computer-readable storage device, that includes profile targeting information that indicates associations between each of the profiles of the profile index 1045 and advertisements or other content which are provided by advertisers (or other content providers), such as advertiser 1030. For example, as illustrated in document 810 of FIG. 8, the advertiser 1030 selects one or more profiles, or combinations of profiles, to which the advertiser 1030 wants to target, such that the advertisement is delivered to individuals whose receipts include information or activity indicating desired consumer spending habits and/or preferences. Specifically, based on inputs provided by the advertiser 1030, the advertisement server 1050 records an indication of such selections in the advertisement index 1055 for use in selecting an advertisement to display or transmit to a user, such as user 1001. For example, an advertiser associated with advertisement 001 (FIG. 8) has selected to target advertisement 001 to individuals whose profile membership information includes profiles 10, 2, or 21. The advertiser associated with advertisement 002 has selected to target advertisement 002 to individuals whose profile membership information includes profiles 7 or 13.

The advertiser can also select various other parameters regarding the distribution of the advertisement, such as scheduling information, which includes the desired number of impressions, the time period in which the advertisement is to be delivered (assuming an e-mail message is received for the user 1001 within that time period), and the location within an e-mail message to display the advertisement. Bid price information can also be selected. The bid price information includes information regarding an amount that the advertiser is willing to pay if the advertisement is displayed or transmitted to a user 1001, an amount the advertiser is willing to pay if a user 1001 clicks-through the advertisement, or an amount the advertiser is willing to pay is a user 1001 purchases a product or service after clicking-through the advertisement. The advertisement server 1050 can also include historical information in the advertisement index 1055, such as information regarding previous selections of the advertisements, performance information, such as click-throughs, or other information.

The profile targeting information and the other distribution parameters, if provided, are used by the advertisement server 1050 in selecting advertisements for delivery to an individual in response to a request for advertisements for the individual, as discussed in greater detail below. To manage the distribution of the advertisements, the advertisers can add and remove advertisements from the advertisement index 1055, or modify the profile targeting information and/or other distribution parameters associated with an advertisement, as desired. For example, if the historical distribution information indicates that a cost per click for a given advertisement is higher than desired, the advertiser can remove the advertisement from the advertisement index 1055, or modify the profile targeting information and/or the other distribution parameters to improve the performance of the advertisement. In some implementations, the advertisement server 1050 can determine, based on the historical information, whether and how the profile targeting information and/or the other distribution parameters should be modified to improve the performance of an advertisement, or to achieve a desired value of one or more performance metrics.

In certain exemplary embodiments, as illustrated in document 820 of FIG. 8, the advertisement index 1055 also includes a listing of the anonymous identifiers 001-999 associated with the users (or the e-mail account of the users) of system 1000, such as user 1001 of the e-mail service provider 1020. The document 820 also includes, for each anonymous identifier, the profile membership information associated with the user 1001, as determined by the profiler 1040. This allows a selection engine 1053, such as a computer processor executing computer-executable instructions, to select a desired number of advertisements from among advertisements 001-999 based on a request for advertisements that includes only the anonymous identifier associated with the user 1001 for which access is requested and the desired number of advertisements. For example, if an advertisement request is received by the advertisement server 1050 for anonymous ID 001, the selection engine 1053 identifies that advertisements targeted to profiles 10, 2, and 21 should be selected. The selection engine 1053 then identifies candidate advertisements from among advertisement IDs 001-999 that are targeted to one or more of profiles 10, 2, and 21. The selection engine 153 can also identify candidate advertisements based on the confidence values included in the profile membership information for anonymous ID 001 and the minimum confidence levels included in the targeting information of the advertisements. For example, advertisement ID 001 may be selected as a candidate advertisement for a request for advertisements for anonymous ID 001 because the profile membership of anonymous ID 001 includes all of the same profiles as the profile targeting information of advertisement ID 001, and because the confidence values for each of the profiles included in the profile membership information of anonymous ID 001 equal or exceed the corresponding minimum confidence values included in the profile targeting information of advertisement ID 001.

In certain exemplary embodiments, the selection engine 1053 can identify candidate advertisements without considering the confidence values of the profile membership information and the minimum confidence levels of the profile targeting information. Additionally, the selection engine 1053 can identify as a candidate advertisement an advertisement ID whose profile targeting information includes any one (compared to all) of the profiles included in the profile membership information.

In certain exemplary embodiments, the advertisement index 1055 does not include the document 820 that includes anonymous IDs, and the request for advertisements includes the profile membership information instead of the anonymous ID. In any case, the advertisement server 1050 needs only to identify the one or more profiles for which advertisements should be selected.

After identifying the candidate advertisements based on the profile membership information of the user 1001 for which the advertisement request was generated and the profile targeting information of the advertisements, the selection engine 1053 selects the desired number of advertisements from among the candidate advertisements. The selection of the desired number of advertisements can involve an auction system that chooses from among the candidate advertisements based on the bid information, the scheduling information, the historical distribution information, and/or quality information. The quality information can be generated, for example, based on an analysis of a landing web page (or destination web page) associated with the advertisement and/or an analysis of the advertisement with respect to the profile membership information. Thus, in certain exemplary embodiments, the selection of advertisements for distribution to the user 1001 in response to an advertisement request balances advertiser's preferences, contextual relevance, revenue considerations, and/or advertisement quality considerations to select the best advertisements or other content to the user 1001.

In certain exemplary embodiments, the selection of advertisements or other content takes into consideration the geographic location of the user 1001 reading an e-mail message or the location (geographic or store location) where a transaction was completed as indicated by one or more of the user's receipts. For example, an advertisement may be displayed to the user 1001 for a music store proximal the user 1001 if the user 1001 is a member of the "music fan" profile discussed above. The geographic location of the user 1001 may be determined from a GPS device stored on or coupled to the user terminal 1013, an IP or MAC address associated with the user terminal 1013, or may be identified by the user 1001.

In certain exemplary embodiments, the selection of advertisements or other content takes into consideration a product or service purchased by the user 1001. For example, if the user's receipt information indicates that the user 1001 recently purchased a television, then a training video, technical brochure, or warranty information regarding the purchased television may be presented to the user 1001. Such information may be presented when the user 1001 is currently viewing the receipt for the television purchase.

One or more of the components of the system 1000, such as the user terminal 1011, the e-mail server 1021, the advertiser 1030, the profiler 1040, and/or the advertisement server 1050, can include one or more computer systems, such as the computer system 600 illustrated in FIG. 6 and discussed above. The input-output module 640 is operable with one or more input and/or output devices 650, including a communication device for operable connection with the network 1060 and with the other components of the system 1000. The one or more computer systems 600 can perform the various functions of the components of the system 1000 by executing computer-readable instructions, such as computer software stored on a computer-readable storage device.

Figure 11:
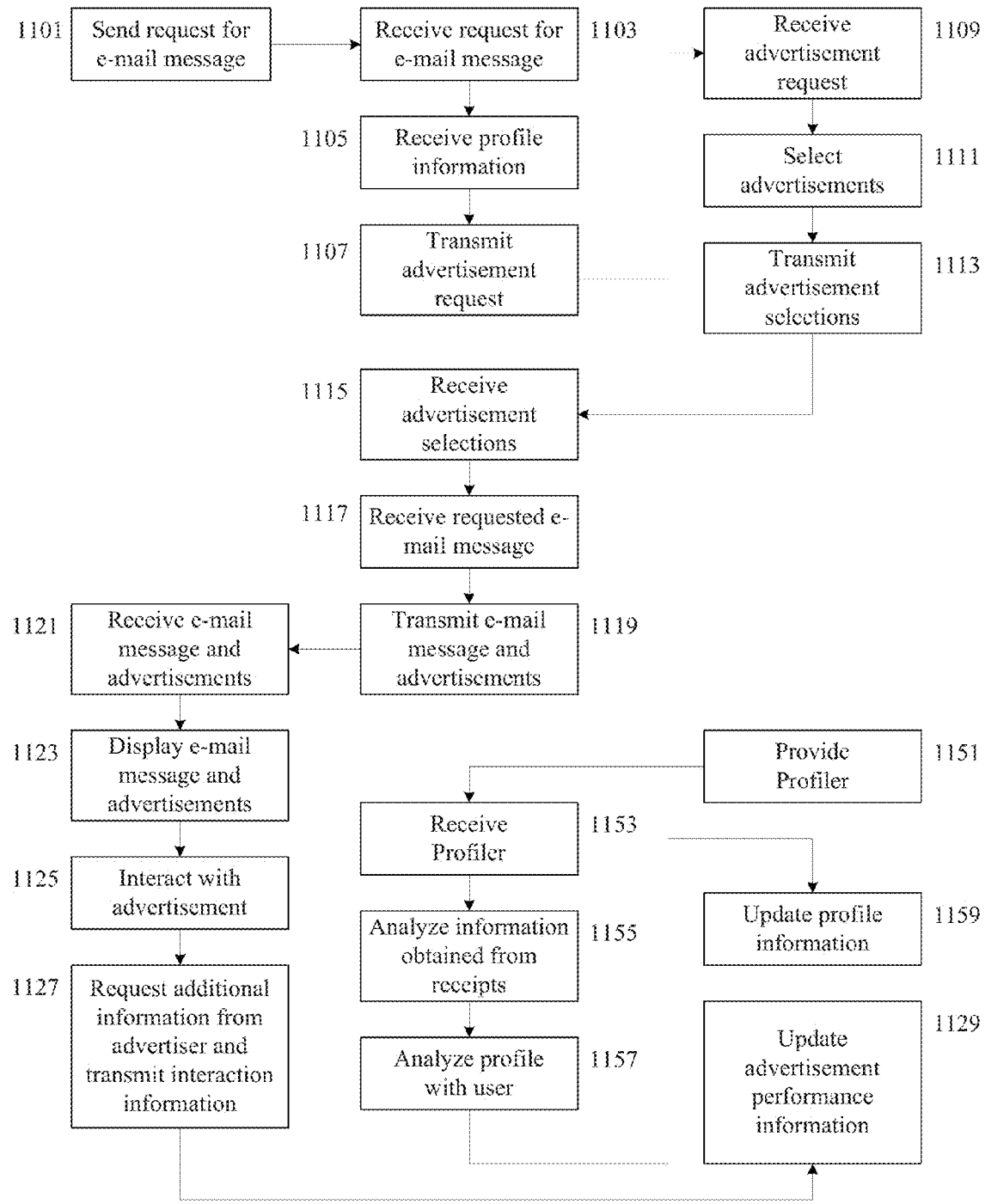
FIG. 11 is a diagram illustrating a process for distributing content, in accordance with certain exemplary embodiments.

In certain exemplary embodiments, as illustrated in FIG. 11, the system 1000 is used to distribute content to users according to an example process 1100. In the example process 1100, a user 1001, using the user terminal 1011, sends a request to the e-mail server 1021 to access one of the user's e-mail messages (1101). For example, the user 1001 may log in to a user interface, such as a web page on which the user's e-mail account is accessible. The user 1001 may then select an e-mail message for display via the user interface. In another example, the user 1001 may initiate an e-mail application, such as Microsoft Outlook, and then select an e-message for display by the e-mail application.

When the e-mail server 1021 receives the request to access one of the user's e-mail messages (203), the e-mail server 1021 retrieves the profile membership information associated with the user's account from the profile index 145 (1105). The e-mail server 1021 then transmits an advertisement request to the advertisement server 1050 (1107). The request includes an anonymous user identifier associated with the user 1001 (or the user's e-mail account) and/or the profile membership information associated with the user 1001 (or the user's e-mail account). The advertisement request can also include additional information, such as demographic information, or other information for use in selecting advertisements, such as historical performance information obtained from prior advertisement selections for the user 1001, as well as information regarding a number and type of advertisements to select. In certain exemplary embodiments, the advertisement request includes an age group (e.g., less than 25, 25-30, 30-45, or greater than 45 years old) that the user 1001 is associated with. In certain exemplary embodiments, the advertisement request can also include content included in the e-mail message that the user 1001 has requested for display.

When the advertisement server 1050 receives the advertisement request (1109), the selection engine 1053 selects one or more advertisements from the advertisement index 1055 based on the information contained in the advertisement request (1111). For example, the selection engine 1053 selects a desired number of advertisements having a desired format, based on the anonymous user identifier, profile membership information, demographic information, time and date information, performance information, the user's geographic location, e-mail message content, and/or other information included in the advertisement request, such as brand affinity information, payment affinity information, and/or portal affinity information. The brand affinity information can include, for example an indication that the user 1001 prefers one or more specific brands of goods or services that are associated with the profile membership information. For example, referring to the "music fan" profile, brand affinity information may indicate that the user 1001 prefers iTunes and does not prefer Amazon.com. The payment affinity information can include an indication that the user 1001 prefers to buy items with a DISCOVER credit card. This information can be used to select advertisements only for merchants that accept this type of credit card. Similarly, the payment affinity information could indicate that the user 1001 frequently purchases gift cards, or that the user 1001 has deposited money in a prepaid account, such as a PAYPAL account, or a PLAYSTATION store account. Thus, advertisements for gift cards, advertisements for items in the PLAYSTATION store, or advertisements from merchants who accept PAYPAL may be preferred for distribution to the user 1001. The portal affinity information can include, for example, an indication that the user 1001 prefers shopping at so called "brick and mortar" establishments. Thus, advertisements for stores in the vicinity of the user's home, advertisements for stores in the vicinity of locations where the individual frequently shops may be preferred.

The selection engine 1053 can also select the advertisements based on the information included in the advertisement index 1055, such as the bid information or other information discussed above. As discussed above, in some implementations, the advertisement index 1055 includes performance information for each of the advertisements that reflects the performance of each advertisement when selected for one or more of the profiles identified in the profile targeting information associated with the advertisement. Additionally, the advertisement index 1055 can include performance information specific to the user 1001 associated with the current advertisement request, including previous advertisement selection information and/or historical interactions with previously-selected advertisements, such as click-throughs.

In certain exemplary embodiments, such as where a user 1001 accesses e-mail messages using a mobile device, such as an Internet enabled cellular phone handset that includes a GPS transceiver, the request can also include GPS information, or other time, date, and location information. In addition, the request can include approximate geographic location information of the user 1001 using an IP or MAC address associated with the user terminal 1011. The selection engine 1053 can then select advertisements for stores that are in close geographic proximity, and which are contextually relevant to the current time at the location. Thus, advertisements for stores which are closed may not be selected. Similarly, advertisements for restaurants offering a special or other discount at the current time, such as an "early bird special" or a "happy hour" special may be favored.

After the advertisements have been selected by the selection engine 1053, the advertisement server 1050 transmits information regarding the selected advertisements to the e-mail server 1021 (1113). For example, the advertisement selection information can include information that identifies the advertisement such that the e-mail server 1021 or the user terminal 1011 can retrieve a copy of the selected advertisements from the respective advertisers, such as from the advertisement repository 1035 of the advertiser 1030. Alternatively, copies of the advertisements can be stored in the advertisement index 1055 and the advertisement selection information can include information sufficient to allow the e-mail server 1021 to cause the advertisement to be displayed on the user terminal 1011.

When the e-mail server 1021 receives the advertisement selection information (1115), the e-mail server 1021 retrieves the requested e-mail message (1117). The e-mail server 1021 then transmits the requested e-mail message (and its contents) and the advertisement selection information to the user terminal 1011 (1119). Alternatively, the e-mail server 1021 may transmit the e-mail message to the user terminal 1011 separate from the advertisement selection information. For example, the e-mail server 1021 may send the e-mail message first and then send advertisement selection information at a later time. In certain exemplary embodiments, the e-mail server 1021 appends the selected advertisement to one or more e-mail messages stored at the e-mail server 1020 such that anytime that message is accessed by the user 1001, the selected advertisement is displayed to the user 1001.

Figure 15:
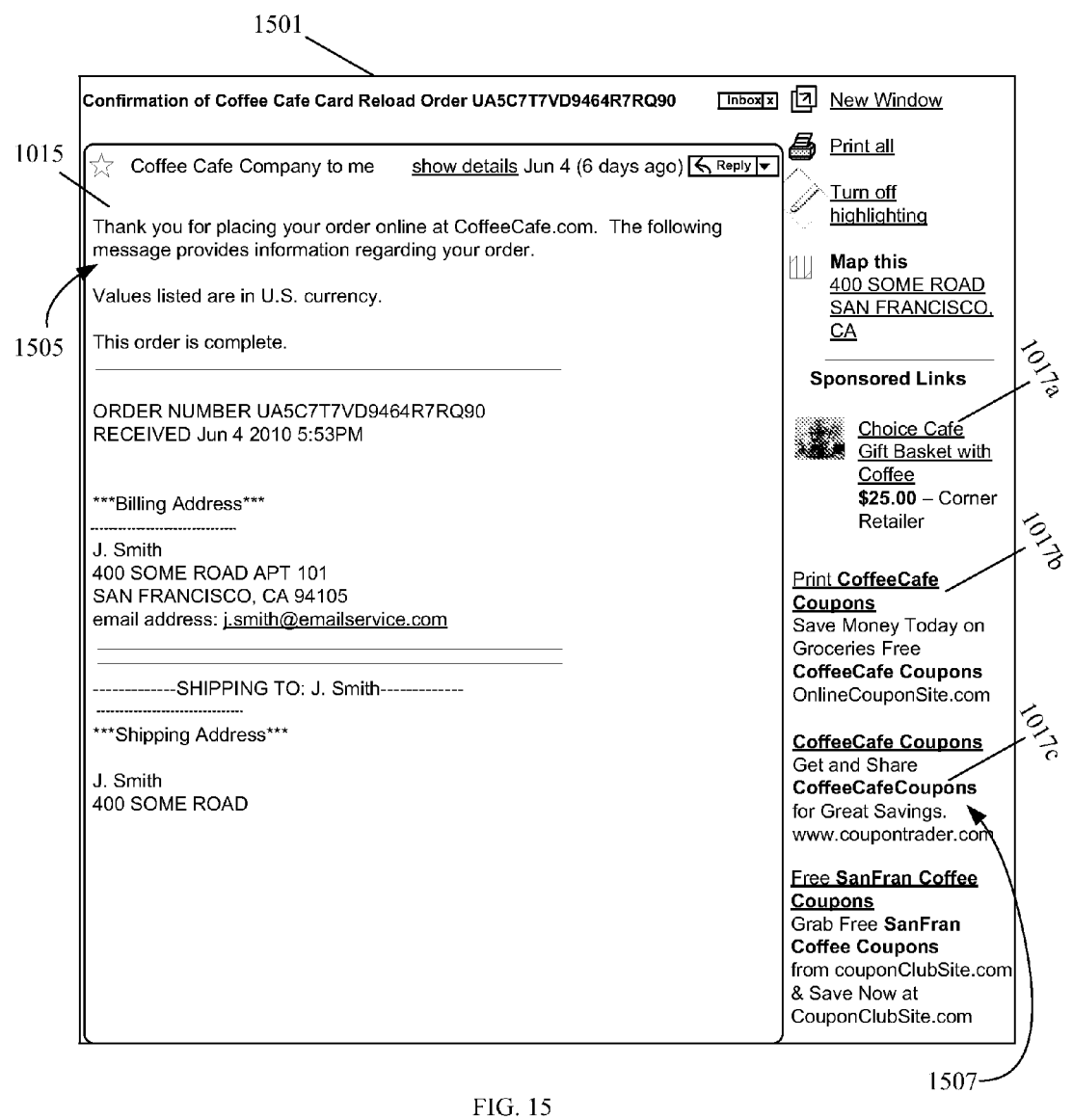
FIG. 15 is an illustration of an example output display of the system of FIG. 10, in accordance with certain exemplary embodiments.

When the user terminal 1011 receives the requested e-mail message and the advertisement selection information (1121), the user terminal 1011 displays the e-mail message and the selected advertisements to the user 1001 (1023). For example, as illustrated in FIG. 15, an e-mail message 1501 is displayed together with selected advertisements 1017*a*-1017*c*. The selected advertisements 1017*a*-1017*c* can be displayed in a predetermined location 1507 simultaneously with the message contents 1015 of the e-mail message 1501, which is displayed in a nearby location 1505. The selected advertisements 1017*a*-1017*c* can be displayed in other locations as well. For example, the selected advertisements 1017*a*-1017*c* may be displayed above the message contents 1015, below the message contents 1015, to the left of the message contents 1015, or interspersed with the message contents 1015. In addition, any number of advertisements may be displayed adjacent or near the message contents 1015. Although in this e-mail message 1501, advertisements 1017*a*-1017*e* are displayed, other content, such as coupons, discounts, brochures, or any other type of promotional material or content may be displayed.

Other display formats and techniques can also be used, as desired by the user 1001, the e-mail service provider 1020, the advertisement server 1050 and/or the advertiser 1030. For example, pop-up windows, pop-under windows, and/or banner ads, or other advertisement display formats can be used. Additionally, the advertisements can be displayed upon log out, or while the e-mail server 1021 retrieves the requested e-mail message. In certain exemplary embodiments, the advertisements can be transmitted to the user 1001 through text messages, by postal service, or through a dedicated promotional portion of the e-mail service provider's web site, such as a "promotions" page. Audio and/or video advertisements can be played by while the individual reviews the e-mail message, such as when the message contents display is rendered, or when the user 1001 clicks on, or places a pointer over, a desired portion of the information (or other portion of the display). Similarly, text advertisements may be displayed when the user 1001 clicks on or places a pointer over a desired portion of the output display of the user terminal 1011.

Regardless of how the selected advertisements are displayed, when the user 1001 interacts with an advertisement (1125), such as by clicking on the display of the advertisement, the user terminal 1011 transmits a request for additional information from the advertiser, such as by following a link to a web page selected by the advertiser, as well as transmits information regarding the interaction to the advertisement server 1050 (1127). For example, when the user 1001 clicks on a displayed advertisement, the user terminal 1011 may process HTML code that causes a new browser window to open with additional information relating to the request, such as a printable coupon, a display advertisement, or a selected page of the advertiser's web site. In some implementations, interacting with the advertisement can cause a change to an account of the user 1001 with the advertiser, such as by adding an item for purchase to the user's shopping cart of the advertiser's electronic commerce web site, or by applying a discount to one or more items in the user's shopping cart (including items subsequently added to the shopping cart).

When the advertisement server 1050 receives the information regarding the interaction with the advertisement, the advertisement server 1050 updates the advertisement index 1055, or other storage device, to indicate that the advertisement was activated (1129). This information can be used for improving the performance of subsequent advertisement selections, for determining a fee to be charged to the advertiser 1030, or for other purposes. Additionally, as discussed above, the profile index 1045 can also include the information regarding the interaction with the advertisement (as well as information indicating that an advertisement was not activated after being displayed). Thus, the user terminal 1011 can also transmit the information regarding the interaction to the profiler 1040 and/or to the e-mail server 1021.

In certain exemplary embodiments, the profiler 1040 is provided to the e-mail server 1021 by the advertisement server 1050, or by another entity associated with the advertisement server 1050 (1151). This allows the advertisement server 1050, or another entity that is experienced in content distribution, to create, update, and manage the profiles, and the software or hardware implementation of the profiler 1040 while allowing for the profile index 1045 to be created and updated by the e-mail service provider 1020. Thus the profile index 1045 can be created and updated without divulging any private information contained in the account records to any parties, while relieving the e-mail service provider 1020 of the burden of the profiler creation and maintenance duties. When the e-mail service provider 1020 receives the profiler 1040 (1153), the e-mail service provider 1020 operates the profiler 1040 to analyze the receipt information for each user 1001 (1155). Based on the analysis, the profiler 1040 associates the users 1001 with the profiles whose criteria are met by the receipt information by storing the profile membership information for each user (257). If the advertisement index 1055 maintained by the advertisement server 1050 includes some of the profile membership, such as the indications of associations between the profiles and anonymous identifiers, then the profiler 1040 also transmits updated information regarding the profile membership information and the anonymous identifiers to the advertisement server 1050, which then updates the profile membership information in the advertisement index 1055 (1159).

In certain exemplary embodiments, the profiler 1040 can be created and/or maintained by the e-mail service provider 1020, or by the advertiser 1030. Additionally, some or all of the features and functions described above with respect to the advertisement server 1050 can be performed by another entity, including the e-mail service provider 1020, if desired. Regardless, the use of the pre-selected profile membership criteria, and the separation of the user's receipts from the advertiser 1030 and other entities, allows targeting of content for distribution based on the profile membership information without revealing the information contained in the user's receipts.

As discussed elsewhere in this disclosure, the anonymous identifiers are not necessary. In some implementations, profile membership information is included in the request for an advertisement or other content, and the selection engine 1053 can select advertisements based on the profile membership information, and the profile targeting information stored in the advertisement index 1055, without using the anonymous identifier that represents the user 1001 or the user's e-mail account.

However, to the extent that an anonymous identifier is provided to the advertisement server 1050, various additional features can be enabled. For example, if the anonymous identifiers are stored in the advertisement index 1055 along with profile membership information, the advertisement server 1050 can pre-select advertisements for distribution to the user 1001 associated with an anonymous identifier. This allows advertisements or other content to be provided to the user 1001 with less delay from the time of a request for e-mail access. Additionally, use of the anonymous identifiers allows the advertisement server 1050 to better track performance of advertisement selections. This can enable better quality advertisement selections to be made for users 1001 such that the users 1001 and the advertisers will be more satisfied with the distribution of the advertisements.

In some implementations, as illustrated in FIG. 12, advertisements (or other content) are distributed by the advertisement server 1050 according to an example process 1200. For example, steps 1109-1113 of the process 1100 of FIG. 11 can include the process 1200. The content distribution process 1200 begins when a request for an advertisement, or other content, is received by the advertisement server 1050 (1201). The advertisement request includes a user identifier, such as an anonymous identifier that is associated with an e-mail account for which access has been requested by a user 1001. The advertisement server 1050 retrieves candidate advertisements previously identified as being targeted for distribution to the user 1001 associated with the anonymous identifier (1203) and selects one or more advertisements from among the retrieved candidate advertisements for distribution to the user 1001 that requested access to the e-mail message (1205).

In certain exemplary embodiments, the advertisement server 1050 retrieves all candidate advertisements previously identified as being targeted for distribution to the user 1001 associated with the anonymous identifier, and selects a number of advertisements indicated in the request for an advertisement from among the candidate advertisements. Thus, in the case where the advertisement request originates at the e-mail server 1021, the number of advertisements distributed to the user 1001 can be controlled by the e-mail server 1021 by including an indication of the desired number of advertisements in the advertisement request. As discussed above, the candidate advertisements can be pre-determined before the advertisement request is received, based on a comparison of the profile membership information associated with the anonymous identifier with the profile targeting information associated with the available advertisements. Thus, retrieving the candidate advertisements includes retrieving a list of pre-selected advertisements associated with the anonymous identifier in the advertisement index 1055. Therefore, retrieving the candidate advertisements can be performed very quickly in response to the request for advertisements. However, in some implementations, the comparison of the profile membership information associated with the anonymous identifier with the profile targeting information associated with the available advertisements (or a comparison of the profile membership information included in the advertisement request with the profile targeting information associated with the available advertisements) to identify the candidate advertisements is performed after receiving the advertisement request.

In a simple example, only advertisements that include profile targeting information that includes all of the profiles included in the profile membership information associated with the anonymous identifier (or included in the advertisement request) are selected as candidate advertisements for distribution in response to an advertisement request for the anonymous identifier. In some implementations, other selection criteria can be used to identify the candidate advertisements. For example, in certain exemplary embodiments, all advertisements that include profile targeting information that includes any one of the profiles included in the profile membership information associated with the anonymous identifier can be identified as candidate advertisements.

Regardless of how the candidate advertisements are selected for the anonymous identifier (or the advertisement request), the selection engine 1053 selects from among the candidate advertisements to determine the advertisement(s) that are distributed to the user 1001 in response to the advertisement request. In some implementations, an auction, such as a second-price weighted ranking auction, can be used. For example, for each of the candidate advertisements, a quality score is combined with a bid price to determine a bid score for the advertisement, and the selection engine 1053 selects the advertisements with the highest bid score first, until a number of available advertisements slots, such as a number included in the request, have been filled. The advertiser associated with each selected advertisements is charged only an amount necessary to obtain a bid score greater than or equal to the bid score or the next highest scoring advertisement.

The quality score indicates a perceived strength of a match between the candidate advertisement and the user 1001 to whom the advertisement will be displayed, if selected. The bid score can be determined, for example, by a comparison of the profile targeting information and the profile membership information. A one-to-one correspondence can correspond to a highest possible quality score, and non-matching profiles included in the profile targeting information or in the profile membership information can result in a lower quality score. Of course, the quality score can be determined according to different processes, as desired. For example, as mentioned above, the quality score can be based on an analysis of a document to which the advertisement refers, such as a landing page of a hypertext link included in the advertisements. In some implementations, the quality score is always a positive number or fraction, and the bid score is obtained by multiplying the bid amount in dollars and the quality score. Thus, a higher quality advertisement may be selected even though a lower dollar amount is bid (or charged, due to the second-price feature).

In certain exemplary embodiments, other types of auctions can be used to select advertisements, or other content, for distribution in response to a request. In other implementations, non-auction selection processes can be used. Regardless of the specific process used to select one or more advertisements from among the retrieved candidate advertisements, the advertisement server 1050 transmits a response to the request for an advertisement (1107). The response can include copies of the selected advertisements themselves for rendering by the user terminal 1011. Additionally or alternatively, the response can include one or more indications of a source of the selected advertisements. Thus, if the advertisement creatives are maintained in the advertisement repository 1035, the response can include a link or other navigational tool operable to cause the user interface 1013 to retrieve the selected advertisements directly from the advertiser 1030.

As illustrated in FIG. 13, the profile membership information for each user 1001 can be determined according to an example process 1300, which can be used, for example, in steps 1155-1157 of the process 1100 of FIG. 11. The example process 1300 begins by accessing information extracted or otherwise obtained from the user's receipts (1301). As described above, the receipt application 1045 can identify receipts received at the user's e-mail account and extract information from the identified receipts.

A determination is then made by the profiler 1040 as to whether a profile exists whose membership criteria needs to be compared to the receipt information (1303). For example, when the profiler 1040 is activated, the profiler 1040 can sequentially compare the membership criteria of each profile in a list of available profiles with the receipt information. After comparing a first profile in the list of available profiles, the profiler 1040 can compare the membership criteria of a second profile in the list, and so on, until the membership criteria of all of profiles in the list of available profiles have been compared to the receipt information.

If a profile needs to be compared to the receipt information, a determination is made regarding whether at least one membership criterion of the profile needs to be checked against the receipt information (1305). If a membership criterion needs to be checked against the receipt information, a determination is made regarding whether or not the membership criterion is met by the user's receipt information (1307) and an indication of whether or not the membership criterion is met is stored, such as in a temporary storage device (1309). Then, another determination is made regarding whether an additional membership criterion needs to be checked against the receipt information (1305). This process loop continues until all of the membership criteria of the profile have been checked. When a determination is made that no more membership criteria need to be checked, a determination can be made regarding whether a sufficient number or combination of membership criteria have been met to warrant including the profile in the profile membership information associated with the user 1001. If inclusion of the profile in the profile membership information is warranted, an indication of an association between the profile and the user 1001 is made in the profile membership information stored in the profile index 1045.

The process 1300 then returns to determine whether another profile needs to be compared to the receipt information. If another profile needs to be compared, steps 1305-1311 are repeated as necessary. When no other profile needs to be compared to the receipt information, the process 1300 ends (1313).

If performed by the profiler 1040 of FIG. 10, a complete profile index 1045 can be created by the process 1300. In certain exemplary embodiments, however, other processes can be used to create the profile index 1045.

Now referring to FIG. 14, the advertiser 1030 can perform an example process 1400 for targeting content for distribution to users 1001 based on profile membership. According to the process 1400, the advertiser 1030 accesses the profiles, such as by accessing documents 910-930, or by accessing a list of available profiles (1401). In certain exemplary embodiments, the advertiser 1030 can access the profile information through an advertiser interface that provides a list of all profiles. Information regarding the membership criteria included in each profile can also be accessed through the advertiser interface such that the advertiser 1030 can decide which profiles target users 1001 whose receipt information includes desired attributes. The advertiser 1030 selects the profiles that include the desired attributes (1403) and assigns the selected profiles to the advertisement (1405) by inputting the selected profiles using the advertiser interface. Then, the advertisement index 1055 is updated to reflect the assigned selections by updating the profile targeting information associated with the advertisement (1407). For example, for advertisement ID 001, the advertiser 1030 selected profiles 10, 2, and 21 as the profiles to which the advertiser wants the advertisement to be targeted.

Additionally, other information, such as the bid information and/or the scheduling information, can be selected by the advertiser 1030 and stored in the advertisement index 1055 for use in selecting advertisements to provide to a user 1001 in response to an advertisement request. Similarly, other selection criteria can be provided by the advertiser 1030. For example, the advertiser 1030 can choose the specific process for determining whether the advertisement should be selected as a candidate advertisement for a given anonymous identifier or a given advertisement request and/or whether the advertisement should be selected for distribution in response to a given request. In one example, the advertiser 1030 can choose to only allow the selection engine 1053 to select the advertisement, either as a candidate advertisement or for distribution in response to a request, where the profile membership information is a perfect match with the profile targeting information selected by the advertiser 1030. In another example, the advertiser 1030 can choose a minimum confidence value for one or more selected profiles such that the selection engine 1053 can select the advertisement only if the confidence values included in the profile membership information meets or exceeds the minimum confidence value. In certain exemplary embodiments, the advertiser 1030 can specify a minimum number of profile matches between the profile membership information and the profile targeting information, and the advertiser 1030 can designate one or more of the profiles as mandatory such that the advertisement is selected only where the profile membership information includes the designated profiles, regardless of the number of other matching profiles between the profile membership information and the profile targeting information.

While the systems 100 and 1000 have largely been discussed separately in terms of either using account records or receipt information to target content to individuals, embodiments that utilize information from both account records and receipt information are also feasible. In such embodiments, profile criteria may be satisfied using activity indicated in either the account records or the receipts of a user 1001. These systems can be configured to recognize duplicate entries for the same transaction such that the information for a transaction is not counted multiple times. For example, is a user 1001 purchases a product using a credit card, information regarding this transaction would appear in the user's credit card statement and possibly in a receipt sent to the user 1001 via e-mail.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

The exemplary embodiments can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, DVD-ROM, etc. Digital circuitry can include integrated circuits, gate arrays, building block logic, field programmable gate arrays ("FPGA"), etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

The invention claimed is:

1. A computer-implemented method for distributing content, comprising:
    evaluating, by a processor, an electronic message to determine whether the electronic message comprises a receipt for a purchase;
    in response to a determination that the electronic message comprises a receipt, extracting, by the processor, purchase information from the receipt;
    selecting, by the processor, content based at least in part upon the purchase information extracted from the receipt, wherein the content comprises content information that is distinct from the purchase information extracted from the receipt; and
    presenting, by the processor, the selected content.

2. The computer-implemented method of claim 1, wherein presenting the selected content comprises appending the selected content to a subsequent electronic message.

3. The computer-implemented method of claim 2, wherein the electronic message and the subsequent electronic message comprise electronic mail messages.

4. The computer-implemented method of claim 1, wherein the purchase information extracted from the receipt comprises at least one of information regarding a product or service purchased, an amount of payment, a source of payment, a payment method used to complete a purchase, a frequency of purchase, information regarding a merchant from which a purchase was made, and a location at which a purchase was made.

5. The computer-implemented method of claim 1, wherein the selection of the content is further based on a geographic location of a user associated with the electronic message.

6. The computer-implemented method of claim 1, wherein evaluating the electronic message to determine whether the electronic message comprises a receipt comprises identifying at least one of a word associated with the receipt, a symbol that represents a currency, and a receipt identification number for the receipt in at least one of content of the electronic message and an attachment to the electronic message.

7. The computer-implemented method of claim 6, wherein the word associated with the receipt includes one of payment, receipt, purchase, transaction, order, billing, shipping, shipped, and total.

8. The computer-implemented method of claim 1, wherein evaluating the electronic message to determine whether the electronic message comprises the receipt comprises receiving an indication that the electronic correspondence comprises a receipt.

9. A computer-implemented method for distributing content, comprising:
    receiving, by a processor, an electronic message associated with an e-mail account for a user;
    evaluating, by the processor, the electronic message associated with the e-mail account for the user to determine that the electronic message comprises a receipt for a purchase;
    extracting, by the processor, purchase information from the receipt;
    storing, by the processor, the purchase information extracted from the receipt in a data store for associating the e-mail account of the user with a content targeting profile;
    associating, by the processor, the e-mail account of the user with the content targeting profile, the content targeting profile based on the purchase information extracted from the receipt;

receiving, by the processor, a request for one or more content, the content comprising content information that is distinct from the purchase information extracted from the receipt;

selecting, by the processor, one or more content for transmission, the one or more content being selected from available content for the content targeting profile associated with the e-mail account of the user; and transmitting, by the processor, the selected content in response to the request for content.

10. The computer-implemented method of claim 9, wherein evaluating the electronic message to determine whether the electronic message comprises a receipt comprises identifying at lease one of a word associated with the receipt, a symbol that represents a currency, and a receipt identification number for the receipt in at least one of (a) content of the electronic message and (b) an attachment to the electronic message.

11. The computer-implemented method of claim 9, wherein the selected content is transmitted in an e-mail message.

12. The computer-implemented method of claim 9, wherein the selected content comprises at least one of an advertisement, a coupon, and a discount.

13. The computer-implemented method of claim 9, wherein transmitting the selected content comprises appending the selected content to a subsequent electronic message.

14. The computer-implemented method of claim 9, wherein the selected content comprises at least one of a training video, product brochure, and promotional material.

15. The computer-implemented method of claim 9, wherein selecting one or more content for transmission comprises:
   determining, by the processor, a geographic location of the user; and
   determining, by the processor, which of the available content is proximal to the user.

16. The computer-implemented method of claim 9, further comprising receiving an indication that the user has interacted with the transmitted content.

17. The computer-implemented method of claim 16, further comprising updating a content index to indicate that the user interacted with the content.

18. The computer-implemented method of claim 9, wherein the selected content is an advertisement, coupon, discount, training video, product brochure, or promotional material.

19. A computer program product, comprising:
   a non-transitory computer-readable medium having computer-readable program instructions embodied therein that when executed by a computer cause the computer to perform a method for distributing content comprising:
      evaluating an electronic message to determine whether the electronic message comprises a receipt for a purchase;
      in response to a determination that the electronic message comprises a receipt, extracting purchase information from the receipt;
      selecting content based at least in part upon the purchase information extracted from the receipt, wherein the content comprises content information that is distinct from the purchase information extracted from the receipt; and
      presenting the selected content.

20. The computer program product of claim 19, wherein the electronic message is associated with an e-mail account for a user.

21. The computer program product of claim 20, further comprising computer-readable program instructions for storing the purchase information extracted from the receipt in a data store for associating the e-mail account of the user with a content targeting profile.

22. The computer program product of claim 21, further comprising computer-readable program instructions for associating the e-mail account of the user with the content targeting profile, the content targeting profile based on the information extracted from the receipt.

23. The computer program product of claim 22, wherein the content is selected from available content for the content targeting profile associated with the e-mail account of the user.

24. The computer program product of claim 19, wherein presenting the selected content comprises computer-readable program instructions for appending the selected content to a subsequent electronic message.

25. The computer program product of claim 19, wherein the selected content is one of an advertisement, coupon, discount, training video, product brochure, and promotional material.

26. The computer program product of claim 19, wherein the information extracted from the receipt comprises at least one of information regarding a product or service purchased, an amount of payment, a source of payment, a payment method used to complete a purchase, a frequency of purchase, information regarding a merchant from which a purchase was made, and a location at which a purchase was made.

27. The computer program product of claim 19, wherein the selection of the content is further based on a geographic location of a user associated with the electronic message.

28. The computer program product of claim 19, wherein evaluating the electronic message to determine whether the electronic message comprises the receipt for the purchase comprises computer-readable program instructions for identifying at least one of a word associated with the receipt, a symbol that represents a currency, and a receipt identification number for the receipt in at least one of content of the electronic message and an attachment to the electronic message.

29. The computer program product of claim 19, wherein evaluating the electronic message to determine whether the electronic message comprises the receipt for the purchase comprises computer-readable program instructions for receiving an indication that the electronic correspondence comprises a receipt.

30. A system for distributing content, the system comprising:
   a storage medium; and
   a processor configured to execute computer-executable instructions stored in the storage medium, the computer-executable instructions comprising:
      instructions for evaluating an electronic message to determine whether the electronic message comprises a receipt for a purchase;
      instructions for extracting purchase information from the receipt;
      instructions for selecting content based at least in part upon the purchase information extracted from the receipt, wherein the content comprises content information that is distinct from the purchase information extracted from the receipt; and
      instructions for presenting the selected content.

31. The system of claim 30, wherein the electronic message is associated with an e-mail account for a user.

32. The system of claim 31, further comprising computer-readable program instructions for storing the purchase information extracted from the receipt in a data store for associating the e-mail account of the user with a content targeting profile.

33. The system of claim 32, further comprising computer-readable program instructions for associating the e-mail account of the user with the content targeting profile, the content targeting profile based on the purchase information extracted from the receipt.

34. The system of claim 33, wherein the content is selected from available content for the content targeting profile associated with the e-mail account of the user.

35. The system of claim 30, wherein presenting the selected content comprises instructions for appending the selected content to a subsequent electronic message.

36. The system of claim 30, wherein the selected content is one of an advertisement, coupon, discount, training video, product brochure, and promotional material.

37. The system of claim 30, wherein the purchase information extracted from the receipt comprises at least one of information regarding a product or service purchased, an amount of payment, a source of payment, a payment method used to complete a purchase, a frequency of purchase, information regarding a merchant from which a purchase was made, and a location at which a purchase was made.

38. The system of claim 30, wherein the selection of the content is further based on a geographic location of a user associated with the electronic message.

39. The system of claim 30, wherein evaluating the electronic message to determine whether the electronic message comprises the receipt for the purchase comprises instructions for identifying at least one of a word associated with the receipt, a symbol that represents a currency, and a receipt identification number for the receipt in at least one of content of the electronic message and an attachment to the electronic message.

40. The system of claim 30, wherein evaluating the electronic message to determine whether the electronic message comprises the receipt for the purchase comprises instructions for receiving an indication that the electronic correspondence comprises a receipt.

\* \* \* \* \*